United States Patent
Kim et al.

(10) Patent No.: US 12,176,735 B2
(45) Date of Patent: Dec. 24, 2024

(54) WIRELESS CHARGING DEVICE FOR PROVIDING TOUCH PAD AND HAPTIC

(71) Applicant: Samsung Electronics Co., Ltd., Suwon-si (KR)

(72) Inventors: Jongheon Kim, Suwon-si (KR); Duckwon Yoon, Suwon-si (KR); Byungku Park, Suwon-si (KR); Jiwoo Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 613 days.

(21) Appl. No.: 17/504,982

(22) Filed: Oct. 19, 2021

(65) Prior Publication Data

US 2022/0123605 A1 Apr. 21, 2022

(30) Foreign Application Priority Data

Oct. 19, 2020 (KR) ........................ 10-2020-0135411

(51) Int. Cl.
*H02J 50/90* (2016.01)
*H02J 50/10* (2016.01)
*H02J 50/80* (2016.01)
*G06F 3/041* (2006.01)
*H02J 50/00* (2016.01)
*H02N 2/18* (2006.01)

(52) U.S. Cl.
CPC .............. *H02J 50/90* (2016.02); *H02J 50/10* (2016.02); *H02J 50/80* (2016.02); *G06F 3/0416* (2013.01); *H02J 50/005* (2020.01); *H02N 2/18* (2013.01)

(58) Field of Classification Search
CPC ....................................................... H02J 50/90
See application file for complete search history.

(56) References Cited

U.S. PATENT DOCUMENTS

| | | |
|---|---|---|
| 8,796,989 B2 | 8/2014 | Lee et al. |
| 10,817,062 B2 | 10/2020 | Bernstein et al. |

(Continued)

FOREIGN PATENT DOCUMENTS

| | | |
|---|---|---|
| JP | 2013-027074 A | 2/2013 |
| KR | 10-2016-0060509 A | 5/2016 |

(Continued)

OTHER PUBLICATIONS

International Search Report dated Feb. 15, 2022, issued in Application No. PCT/KR2021/014595.

*Primary Examiner* — Robert Grant
(74) *Attorney, Agent, or Firm* — Jefferson IP Law, LLP

(57) ABSTRACT

An electronic device supporting a wireless charging function is provided. The electronic device includes a housing, a wireless charging coil disposed in the housing, a plurality of piezoelectric elements disposed around the wireless charging coil, a touch panel apart from the wireless charging coil in one direction, and at least one processor electrically connected with the wireless charging coil, the plurality of the piezoelectric elements, and the touch panel, wherein the at least one processor may be configured to obtain pressure data of an external device placed on the touch panel using the plurality of the piezoelectric elements, determine alignment of the external device and the wireless charging coil based on the pressure data, and output an alignment notification according to a result of determining the alignment.

20 Claims, 21 Drawing Sheets

(56) References Cited

U.S. PATENT DOCUMENTS

| | | | |
|---|---|---|---|
| 11,366,523 B2 | 6/2022 | Ligtenberg et al. | |
| 2008/0258679 A1* | 10/2008 | Manico | G06F 1/1632 320/106 |
| 2013/0127255 A1 | 5/2013 | Tsujimoto | |
| 2015/0028802 A1 | 1/2015 | Lee et al. | |
| 2015/0301602 A1 | 10/2015 | Dow et al. | |
| 2015/0338887 A1 | 11/2015 | Farahani et al. | |
| 2016/0052450 A1 | 2/2016 | Chan et al. | |
| 2016/0374049 A1 | 12/2016 | Ha et al. | |
| 2017/0047783 A1 | 2/2017 | Shevde et al. | |
| 2018/0212455 A1 | 7/2018 | Kasar et al. | |
| 2018/0226827 A1* | 8/2018 | Chen | H02J 7/0047 |

FOREIGN PATENT DOCUMENTS

| | | |
|---|---|---|
| KR | 10-1659080 B1 | 9/2016 |
| KR | 10-1799741 B1 | 11/2017 |

\* cited by examiner

WIRELESS CHARGING DEVICE FOR PROVIDING TOUCH PAD AND HAPTIC

CROSS-REFERENCE TO RELATED APPLICATION(S)

This application is based on and claims priority under 35 U.S.C. § 119(a) of a Korean patent application number 10-2020-0135411, filed on Oct. 19, 2020, in the Korean Intellectual Property Office, the disclosure of which is incorporated by reference herein in its entirety.

BACKGROUND

1. Field

The disclosure relates to a technique for providing feedback for alignment of a wireless charging device. More particularly, the disclosure relates to an apparatus and a method for determining and displaying whether the wireless charging coil of a wireless power transmitting unit (PTU) and a wireless power receiving unit (PRU) are aligned or mis-aligned by measuring a charging frequency of the PRU or voltage power data through the wireless charging coil of the PTU.

2. Description of Related Art

Electronic devices (e.g., a mobile terminal, a notebook computer, a smart phone, or a wearable device) may provide various functions. For example, in addition to a basic voice communication function, the electronic device may provide a short-range wireless communication function, a mobile communication (e.g., $3^{rd}$ generation (3G), $4^{th}$ generation (4G), or $5^{th}$ generation (5G)) function, a music play function, a video play function, a camera function, a navigation function or a wireless charging function.

The electronic device may charge a battery by use of the wireless charging function, without using a separate cable. For example, the electronic device may charge its battery using electromagnetic induction or electromagnetic resonance generating between a wireless power transmitting unit (PTU) and a wireless power receiving unit (PRU).

The electronic device which provides the wireless charging function may include a wireless charging coil. Hence, related art determines and displays whether the wireless charging coil of the PTU and the PRU are aligned or mis-aligned by measuring a charging frequency of the PRU or voltage power data through the wireless charging coil of the PTU.

The above information is presented as background information only to assist with an understanding of the disclosure. No determination has been made, and no assertion is made, as to whether any of the above might be applicable as prior art with regard to the disclosure.

SUMMARY

Since related art determines and displays alignment or mis-alignment based on power data of a power receiving unit, it may be difficult for a user to recognize alignment information unless he/she intentionally identifies the alignment on a display.

Embodiments of the disclosure measure pressure data of an external device placed on a touch pad through a piezoelectric element, determine alignment of a power receiving unit and a power transmitting unit, and provide haptic feedback according to the alignment determination.

Aspects of the disclosure are to address at least the above-mentioned problems and/or disadvantages and to provide at least the advantages described below. Accordingly, an aspect of the disclosure is to provide an apparatus and a method for determining and displaying whether the wireless charging coil of a wireless power transmitting unit (PTU) and a wireless power receiving unit (PRU) are aligned or mis-aligned by measuring a charging frequency of the PRU or voltage power data through the wireless charging coil of the PTU.

Additional aspects will be set forth in part in the description which follows and, in part, will be apparent from the description, or may be learned by practice of the presented embodiments.

In accordance with an aspect of the disclosure, an electronic device supporting a wireless charging function is provided. The electronic device includes a housing, a wireless charging coil disposed in the housing, a plurality of piezoelectric elements disposed around the wireless charging coil, a touch panel apart from the wireless charging coil in one direction, and at least one processor electrically connected with the wireless charging coil, the plurality of the piezoelectric elements, and the touch panel, wherein the at least one processor may be configured to obtain pressure data of an external device placed on the touch panel using the plurality of the piezoelectric elements, determine alignment of the external device and the wireless charging coil based on the pressure data, and output an alignment notification according to a result of determining the alignment.

In accordance with another aspect of the disclosure, a method of an electronic device is provided. The method includes obtaining pressure data of an external device using a plurality of piezoelectric elements, determining alignment of the external device and a wireless charging coil based on the pressure data, and outputting an alignment notification according to a result of determining the alignment.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
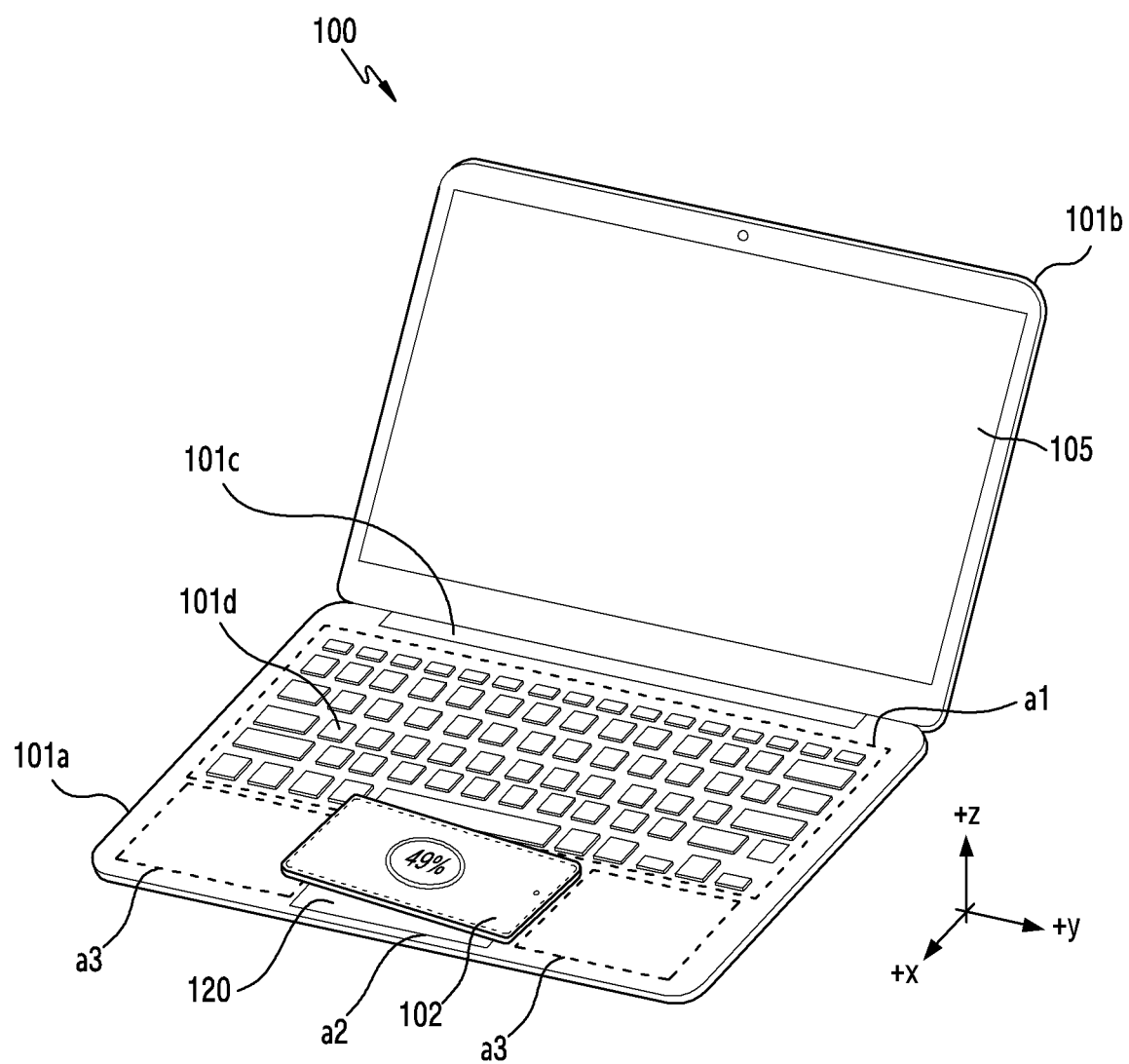
FIG. 1 is a perspective view of an unfolded electronic device with a touch pad mounted and an external device placed on the touch pad according to an embodiment of the disclosure.

FIG. 1 is a perspective view of an unfolded electronic device 100 with a touch pad 120 mounted and an external device 102 placed on the touch pad 120 according to an embodiment of the disclosure.

Referring to FIG. 1, in an embodiment of the disclosure, the electronic device 100 may include a first housing 101*a*, a second housing 101*b*, and a connecting unit 101*c* which interconnects the first housing 101*a* and the second housing 101*b*. A hinge may be adopted if the first housing 101*a* and the second housing 101*b* are structurally connected for rotation based on a rotation axis, and a folding device may be provided if they are folded or unfolded.

In an embodiment of the disclosure, the first housing 101*a* may protect various electronic parts and form exterior of the electronic device 100. In an embodiment of the disclosure, the first housing 101*a* may include a first surface which faces a first direction (+Z axis) and a second surface which faces a second direction (−Z axis) which is the opposite direction. In an embodiment of the disclosure, the first surface may be an inner surface of the electronic device 100, and the second surface may be an outer surface of the electronic device 100. In another embodiment of the disclosure, the first surface may be a top surface of the first housing 101*a*, and the second surface may be a bottom surface of the first housing 101*a*.

In an embodiment of the disclosure, the first housing 101*a* may include a plurality of keys 101*d*, the touch pad 120, and a palm rest, in the first surface. The plurality of the keys 101*d* may be disposed in the first surface of the first housing 101*a*, and the plurality of the keys 101*a* may be referred to as a data input device, a keyboard or a keyboard housing. In an embodiment of the disclosure, the plurality of the keys 101*d* may be arranged in, but not limited to, a QWERTY layout, and may adopt various layouts. An area including the plurality of the keys 101*d* in the first housing 101*a* may be referred to as a keyboard area.

In an embodiment of the disclosure, the first surface of the first housing 101*a* may include a first area a1 including the plurality of the keys 101*d*, a second area a2 including the touch pad 120 and a third area a3 including the palm rest. In an embodiment of the disclosure, the first area a1, the second area a2 and the third area a3 may be disposed in parallel not to overlap each other. In an embodiment of the disclosure, the third area a3 may be formed on left and right sides of the second area a2.

In an embodiment of the disclosure, the third area a3 may be formed with, by way of example, but not limited to, a metal material. For example, the third area a3 may be formed with other material (e.g., a polymeric material) than the metal material or with a combination of the metal material and other material.

Figure 3A:
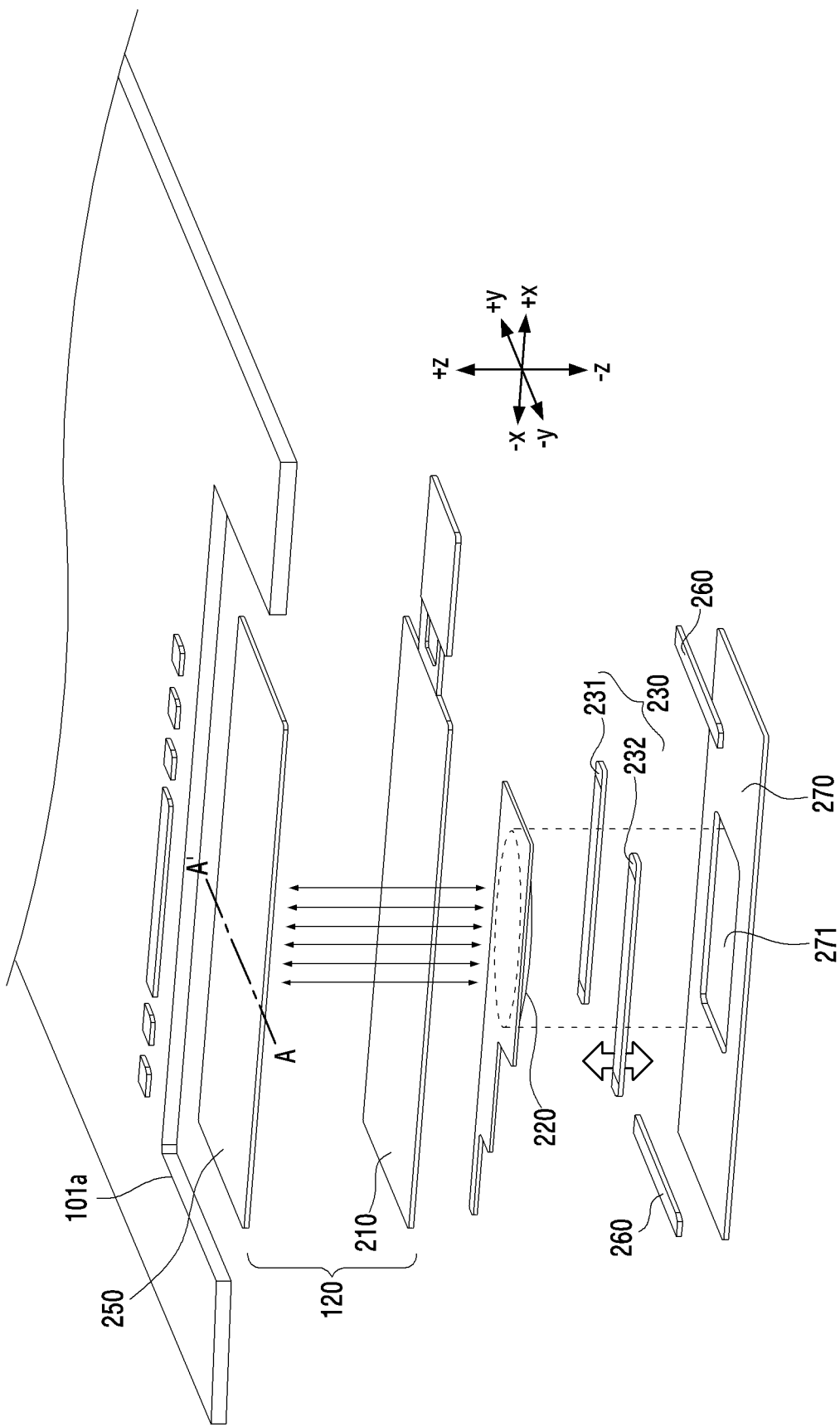
FIG. 3A is an exploded view of a touch pad and a wireless charging device according to an embodiment of the disclosure.

In an embodiment of the disclosure, the touch pad 120 may include a touch panel 210 and/or a cover member 250, to be described in FIG. 3A.

In an embodiment of the disclosure, a position of the touch pad 120 may correspond to a position of a wireless charging coil 220, to be explained in FIG. 3A. For example, the touch pad 120 may be disposed on of the wireless charging coil 220 (e.g., in +z direction of FIG. 3A).

In an embodiment of the disclosure, the second housing 101b may protect various electronic parts and form the exterior of the electronic device 100. In an embodiment of the disclosure, the second housing 101b may include a first surface which faces the first direction and a second surface which faces the second direction which is the opposite direction. In an embodiment of the disclosure, the first surface may be an inner surface of the electronic device 100, and the second surface may be an outer surface of the electronic device 100. In another embodiment of the disclosure, the first surface may be a top surface of the second housing 101b, and the second surface may be a bottom surface of the second housing 101b.

In an embodiment of the disclosure, a display 105 may be disposed in the first surface of the second housing 101b. The display 105 may include a touch sensitive panel, and serve as a touch screen using the touch sensitive panel.

The embodiments of the disclosure are not limited thereto. For example, a side surface of the electronic device 100 may include a ventilation hole through which air flowing from outside is exhausted through the inside of the electronic device 100 to cool heat generating in the electronic device 100.

In an embodiment of the disclosure, the wireless charging coil 220 configured to transmit wireless charging power may be disposed below the touch pad 120. In an embodiment of the disclosure, the external device 102 placed on of the touch pad 120 (e.g., in +z direction of FIG. 3A) may receive the wireless charging power from the wireless charging coil 220, and charge its battery using the received wireless charging power.

Figure 2:
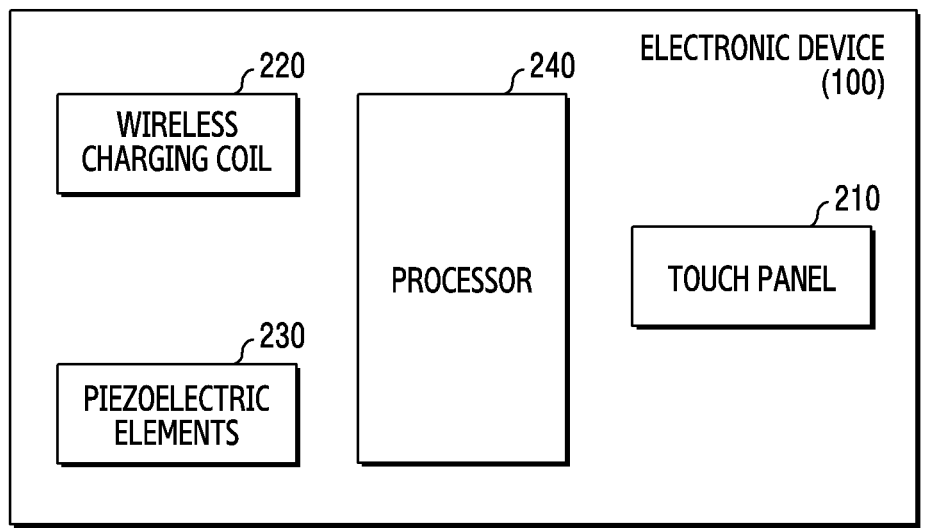
FIG. 2 is a block diagram for a wireless charging function in an electronic device according to an embodiment of the disclosure.

FIG. 2 is a block diagram for a wireless charging function in an electronic device 100 according to an embodiment of the disclosure.

Referring to FIG. 2, the electronic device 100 may include the touch panel 210, the wireless charging coil 220, a plurality of piezoelectric elements 230, and a processor 240. In an embodiment of the disclosure, the processor 240 may be electrically connected with the touch panel 210, the wireless charging coil 220, and the plurality of the piezoelectric elements 230.

In an embodiment of the disclosure, the processor 240 electrically connected with the touch panel 240 may receive a detection signal corresponding to the external device 102 detected by the touch panel 210. If the external device 102 approaches the touch panel 210, the touch panel 210 may recognize a capacitance pattern corresponding to the external device 102 having the capacitance pattern which is distinguished from a human body. The touch panel 210 may recognize the capacitance pattern corresponding to the external device 102 and then transmit the detection signal corresponding to the external device 102 to the processor 240. In response, the plurality of the piezoelectric elements 230 may measure pressure data of the external device 102, and the processor 240 may determine alignment of the external device 102 and the wireless charging coil 220 based on the pressure data, and output a notification according to an alignment determination result. For example, the processor 240 may determine the alignment of a center of mass of the external device 102 and the wireless charging coil 220 based on the pressure data, and output a notification according to an alignment determination result.

In an embodiment of the disclosure, if determining the alignment of the wireless charging coil 220 and the external device 102, the processor 240 may transmit the same control signal to the plurality of the piezoelectric elements 230. The plurality of the piezoelectric elements 230 receiving the same control signal may provide uniform haptic feedback. For example, if first pressure data acquired using a first piezoelectric element (e.g., a first piezoelectric element 231 of FIG. 3A) and second pressure data acquired using a second piezoelectric element (e.g., a second piezoelectric element 232 of FIG. 3A) are the same or fall within the same range, the processor 240 may determine that the wireless charging coil 220 and the external device 102 are aligned. In response to the determination result indicating the alignment, the processor 240 may transmit the same control signal to the first piezoelectric element 231 and the second piezoelectric element 232. The first piezoelectric element 231 and the second piezoelectric element 232 receiving the same control signal may provide the uniform haptic feedback. The same control signal may be a vibration voltage, a vibration frequency, a vibration period and/or a vibration time.

In an embodiment of the disclosure, if determining the mis-alignment of the wireless charging coil 220 and the external device 102, the processor 240 may transmit individual (e.g., different) control signals to the plurality of the piezoelectric elements 230. In an embodiment of the disclosure, the plurality of the piezoelectric elements 230 receiving the individual control signals may provide differential haptic feedback. For example, if the first pressure data acquired using the first piezoelectric element 231 and the second pressure data acquired using the second piezoelectric element 232 are not the same or does not fall within the same range, the processor 240 may determine that the wireless charging coil 220 and the external device 102 are mis-aligned. In response to the determination result indicating the mis-alignment, the processor 240 may transmit individual control signals to the first piezoelectric element 231 and the second piezoelectric element 232. The first piezoelectric element 231 and the second piezoelectric element 232 receiving the individual control signals may provide differential haptic feedback. For example, if the first pressure data acquired using the first piezoelectric element 231 is greater than the second pressure data acquired using the second piezoelectric element 232, it may indicate that the external device 102 is placed close to the first piezoelectric element 231. In this case, the processor 240 may determine that the external device 102 and the wireless charging coil 220 are mis-aligned. In response to the determination result indicating the mis-alignment, the processor 240 may transmit the individual control signals. The processor 240 may transmit a first control signal having a high vibration voltage to the first piezoelectric element 231, and transmit a second control signal having a lower vibration voltage than the first control signal to the second piezoelectric element 232, wherein the first piezoelectric element 231 outputs a strong haptic feedback.

Hereafter, the touch pad 120 and the wireless charging device mounted in the second area a2 of the electronic device 100 are described by referring to the attached drawings.

FIG. 3A is an exploded view of a touch pad 120 and a wireless charging device according to an embodiment of the disclosure.

Referring to FIG. 3A, the touch pad 120 may include the touch panel 210 and the cover member 250.

In an embodiment of the disclosure, the touch pad 120 may detect a specific signal based on a contact of an input target (e.g., at least part of a human body, a digital pen). The touch pad 120 may identify a position indicated by a user or process a user input based on the detected signal. For example, the touch pad 120 may process coordinate (e.g., an X-axis coordinate and/or a Y-axis coordinate) information of the contacted point. In addition, the touch panel 210 may detect the external device 102, and transfer a signal relating to the detection of the external device 102 to the processor 240.

In an embodiment of the disclosure, the wireless charging coil 220 may be disposed below the touch panel 210 to transmit the wireless charging power.

In an embodiment of the disclosure, the electronic device 100 may further include the cover member 250 for protecting the touch panel 210, on the touch panel 210. In an embodiment of the disclosure, the cover member 250 may be formed of a nonconductive member. For example, the cover member 250 may include, by way of example, but not limited to, a glass plate, a fiberglass-reinforced plastics (FRP) plate, a polyvinyl fluoride (PVF) film, a milar film, a polyester film, or an acryl film. For example, the cover member 250 may be formed of various materials which do not interrupt the transmission of the wireless charging power.

In an embodiment of the disclosure, the electronic device 100 may include the wireless charging coil (e.g., a power receiving and/or power transmitting coil) 220 for the wireless charging.

In an embodiment of the disclosure, the electronic device 100 may wirelessly provide power required by the external device 102 using the wireless charging coil 220.

In an embodiment of the disclosure, the wireless charging coil 220 may be deposited below the touch panel 210.

Figure 6A:
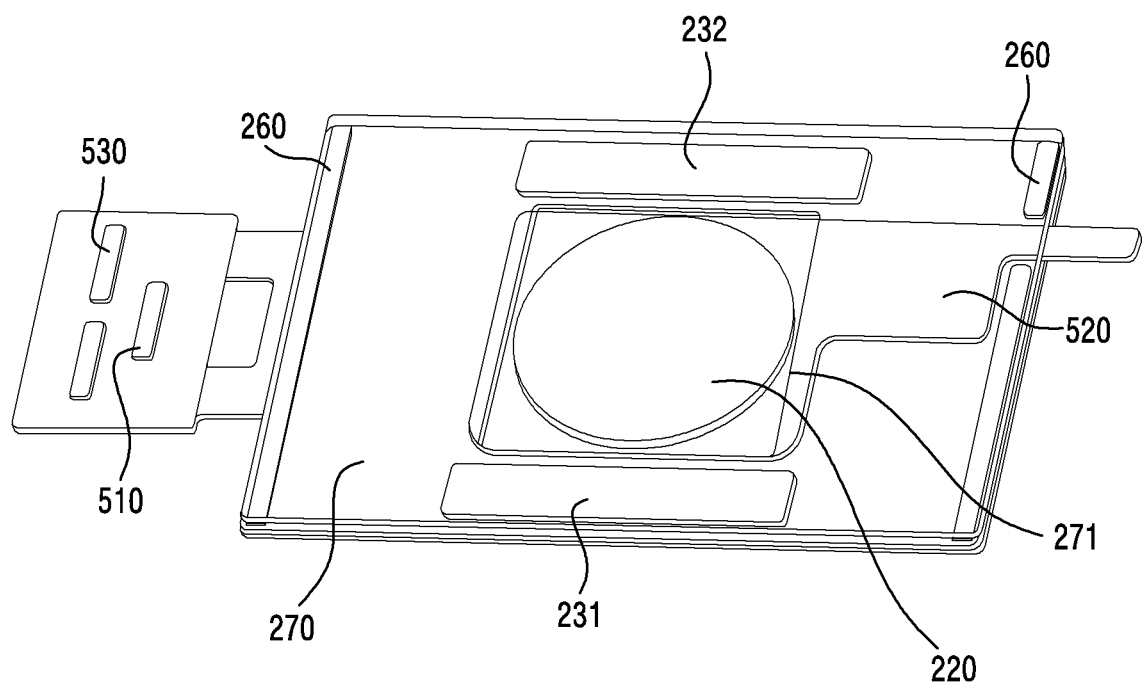
FIG. 6A is a rear view of an electronic device for a wireless charging function to provide a touch pad and a haptic feedback according to an embodiment of the disclosure.
Figure 6B:
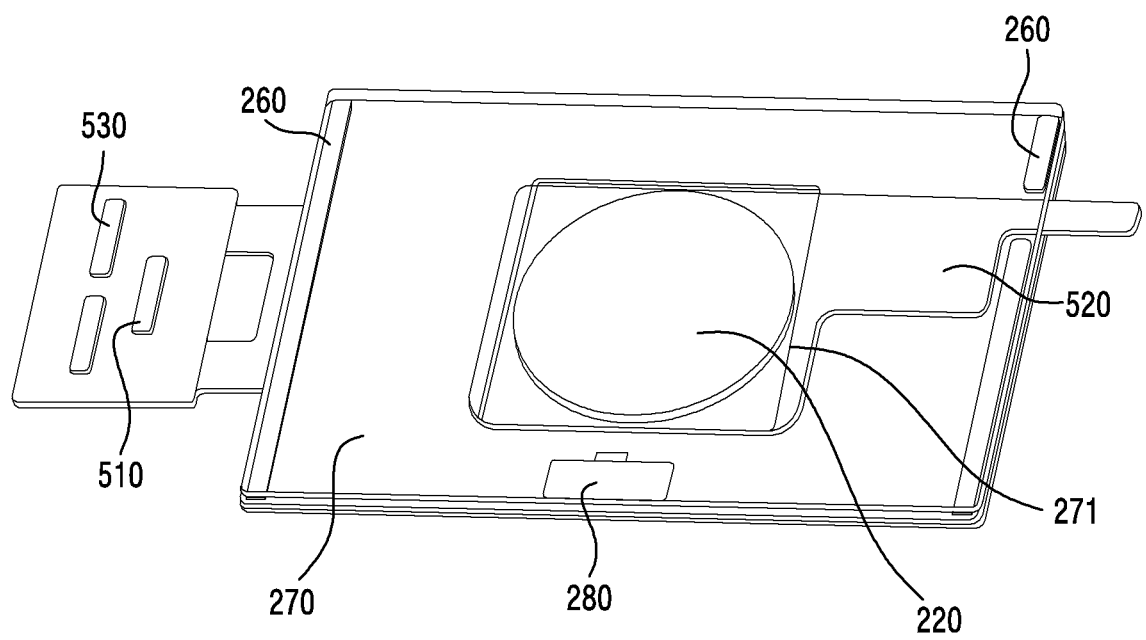
FIG. 6B is a rear view of an electronic device for a wireless charging function to provide a touch pad and a haptic feedback according to an embodiment of the disclosure.
Figure 6C:
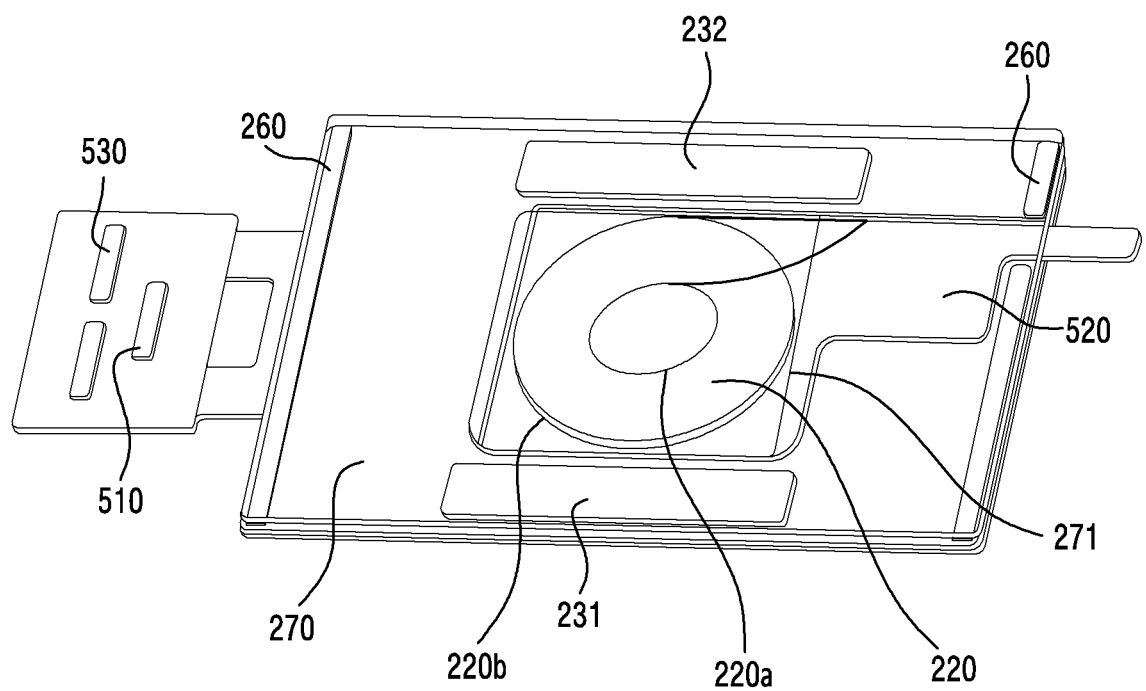
FIG. 6C is a rear view of an electronic device for a wireless charging function to provide a touch pad and a haptic feedback according to an embodiment of the disclosure.

In an embodiment of the disclosure, the wireless charging coil 220 may include an inner coil 220a and an outer coil 220b to be described in FIG. 6C.

In an embodiment of the disclosure, the wireless charging coil 220 may include a coil flexible printed circuit board (FPCB) including a pattern of the wireless charging coil 220.

In an embodiment of the disclosure, the electronic device 100 may include the plurality of the piezoelectric elements 230 for measuring the pressure data of the external device 102 placed on the cover member 250 disposed on the wireless charging coil 220 (e.g., in the +z direction of FIG. 3A). The plurality of the piezoelectric elements 230 may be disposed close to an outer boundary of the wireless charging coil 220, and may be disposed to face each other at the same distance from the center of the wireless charging coil 220.

In an embodiment of the disclosure, in wirelessly providing the power required by the external device 102 using the wireless charging coil 220, the plurality of the piezoelectric elements 230 may measure the pressure data of the external device 102 and the processor 240 may determine whether the wireless charging coil 220 and a coil in the external device 102 are aligned, based on the pressure data.

In an embodiment of the disclosure, the plurality of the piezoelectric elements 230 may include the first piezoelectric element 231 and the second piezoelectric element 232.

In an embodiment of the disclosure, the first piezoelectric element 231 may be disposed in a first direction (e.g., +y direction of FIG. 3A) of the wireless charging coil 220, in a bar shape. The second piezoelectric element 232 may be disposed in a second direction (e.g., −y direction of FIG. 3A) of the wireless charging coil 220, in a bar shape.

In an embodiment of the disclosure, the first piezoelectric element may be disposed in a first direction (e.g., +y direction of FIG. 3A) of the wireless charging coil 220, in a bar shape may detect the pressure data of the external device 102, and transfer the pressure data to the processor 240.

In an embodiment of the disclosure, the plurality of the piezoelectric elements 230 may detect the pressure data of the external device 102 and transfer the pressure data to the processor 240.

In an embodiment of the disclosure, the electronic device 100 may further include an elastic member 260 around the plurality of the piezoelectric elements 230. For example, the elastic member 260 may include, for example, but not limited to, a cushion, and/or a rubber.

In an embodiment of the disclosure, the elastic member 260 may be interposed between the touch panel 210 and a support member 270. The elastic member 260 may be disposed on the left (e.g., in +x direction of FIG. 3A) and/or on the right (e.g., in −x direction of FIG. 3A) of the wireless charging coil 220. In an embodiment of the disclosure, the elastic member 260 may be disposed around the plurality of the piezoelectric elements 230. For example, the elastic member 260 may be disposed in the first direction (e.g., the +y direction of FIG. 3A) of the first piezoelectric element 231 and/or the second direction (e.g., the −y direction of FIG. 3A) of the second piezoelectric element 232. The elastic member 260 may reduce the haptic feedback outputted by the plurality of the piezoelectric elements 230, transferring to other area of the electronic device 100 than the second area a2 of the touch pad 120. The elastic member 260 may support the touch panel 210 and the support member 270. The elastic member 260 may absorb pressure exerted on the electronic device 100.

In an embodiment of the disclosure, the first housing 101a may further include the support member 270 for supporting the touch panel 210, the wireless charging coil 220, and/or the plurality of the piezoelectric elements 230 therein.

In an embodiment of the disclosure, an opening 271 for inserting the wireless charging device (e.g., the wireless charging coil 220) may be formed in at least part of the support member 270. For example, the opening 271 may be formed in various shapes (e.g., a circular shape or a rectangular shape) with respect to the area corresponding to the wireless charging coil 220. The wireless charging coil 220 is disposed through the opening 271, and accordingly thickness increase of the first housing 101a may be reduced.

In an embodiment of the disclosure, the electronic device 100 may include a shielding material for shielding from electromagnetic field leaked by a circuit, near the wireless charging coil 220.

Figure 3B:
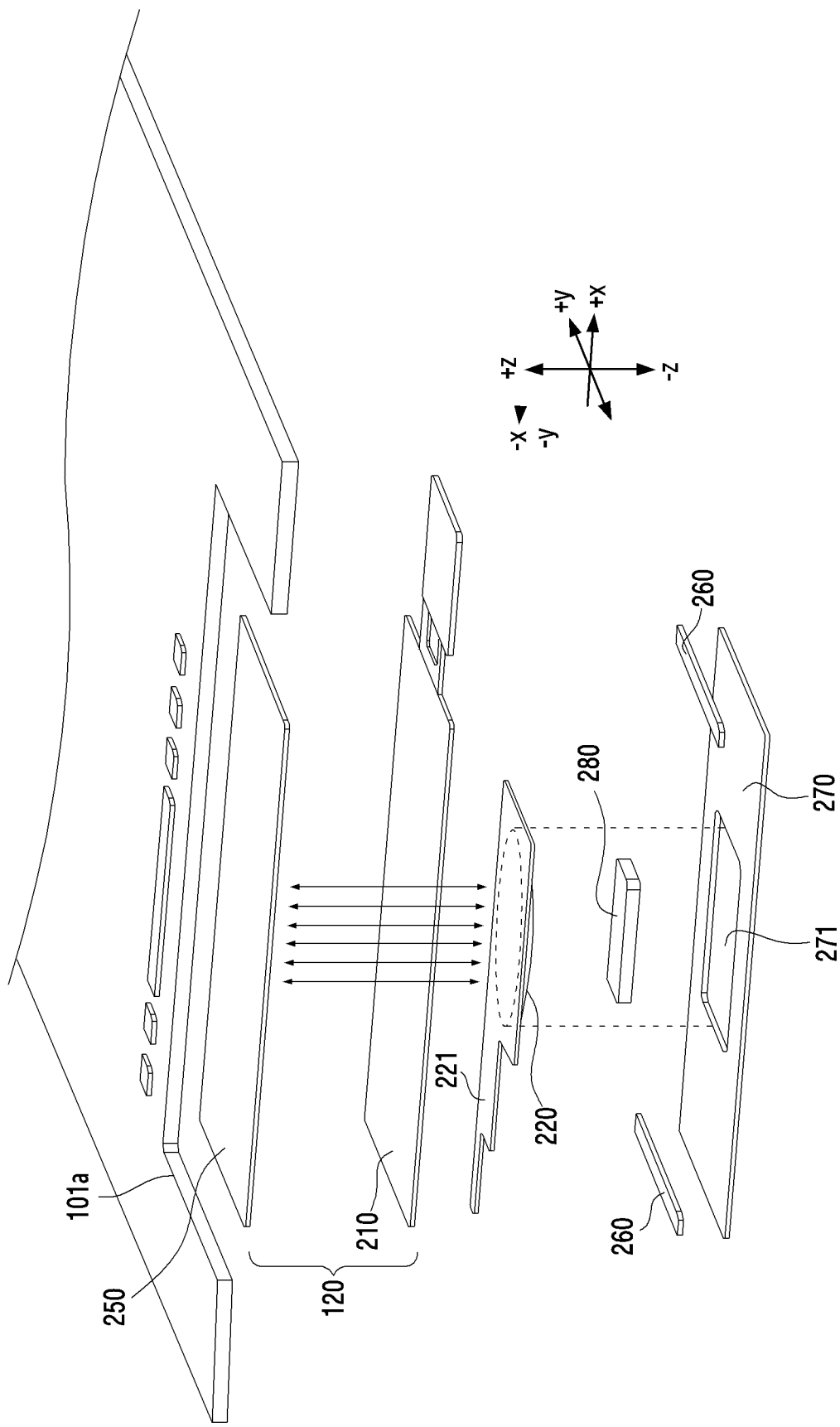
FIG. 3B is an exploded view of a touch pad and a wireless charging device according to an embodiment of the disclosure.

FIG. 3B is an exploded view of the touch pad 120 and the wireless charging device according to an embodiment of the disclosure.

Referring to FIG. 3B, the electronic device 100 may include a vibrating element 280.

In an embodiment of the disclosure, the vibrating element 280 may be disposed below the touch panel 210 (e.g., in the −z direction of FIG. 3B).

In an embodiment of the disclosure, the touch panel 210 may further include a pressure sensor. For example, the touch panel 210 may not only detect the external device 102, but also measure the pressure data of the external device 102 by further including the pressure sensor.

In an embodiment of the disclosure, if the pressure sensor of the touch panel 210 measures the pressure data of the external device 102, the processor 240 may determine the alignment of the external device 102 and the wireless charging coil 220 based on the pressure data. The processor 240 may provide a control signal to the vibrating element 280 based on the determination result, and the vibrating element 280 may output a haptic feedback according to the control signal.

At least part of the touch pad 120 may have a structure exposed through an opening formed in at least part of the first housing 101a of the electronic device 100.

The touch pad 120 and the wireless charging coil 220 may, for example, but not limited to, be separated from each other in structure as mentioned above. For example, the touch pad 120 and the wireless charging coil 220 may be integrated.

Figure 4:
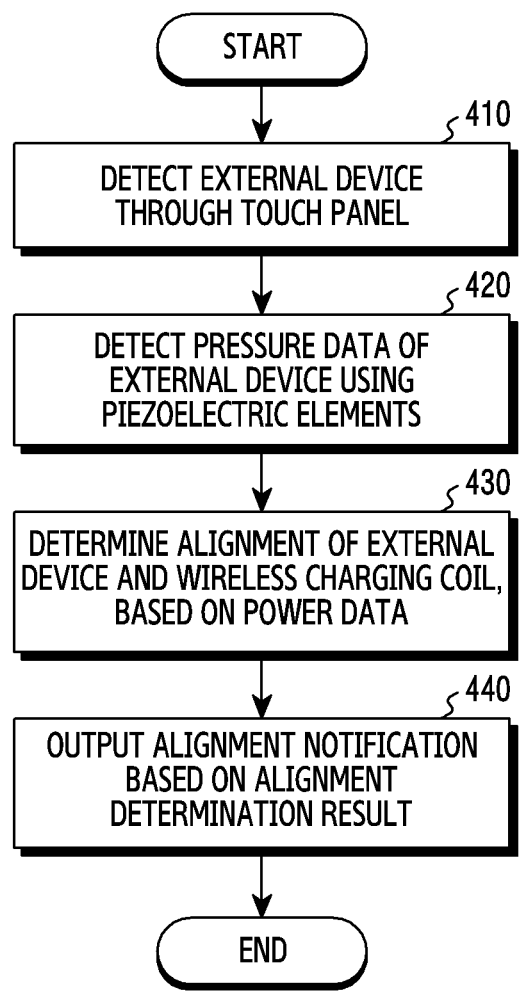
FIG. 4 is a flowchart for providing a wireless charging function in an electronic device according to an embodiment of the disclosure.

FIG. 4 is a flowchart for providing a wireless charging function in an electronic device 100 according to an embodiment of the disclosure.

Operations in the embodiment may be performed sequentially, but not necessarily. For example, the order of the operations may be changed, and at least two operations may be performed in parallel.

Referring to FIG. 4, in an embodiment of the disclosure, the electronic device 100 (e.g., the processor 240 of FIG. 2) may detect the external device 102 in operation 410. In an embodiment of the disclosure, the touch panel 210 may detect the external device 102. In another embodiment of the disclosure, operation 410 may be omitted. For example, if a device or an object not supporting the wireless charging is placed on the touch panel 210, the pressure may be detected using the plurality of the piezoelectric elements 230, wherein providing the haptic feedback has no meaning. Hence, detecting whether the external device 102 is an electronic device using the touch panel 210 may precede detecting the pressure data using the plurality of the piezoelectric elements 230 (operation 420). However, in an embodiment of the disclosure, the pressure may be detected using the plurality of the piezoelectric elements 230 regardless of the type of the external device placed on the touch panel 210, wherein operation 410 may be omitted. In an embodiment of the disclosure, in response to detecting the external device 102, the electronic device 100 (e.g., the processor 240 of FIG. 2) may obtain power data of the external device 102 using the wireless charging coil 220. In an embodiment of the disclosure, before operation 430 of the electronic device 100 (e.g., the processor 240 of FIG. 2), the electronic device 100 (e.g., the processor 240 of FIG. 2) may preliminarily determine the alignment of the external device 102 and the wireless charging coil 220 based on the power data.

In an embodiment of the disclosure, the electronic device 100 (e.g., the processor 240 of FIG. 2) may measure the pressure data of the external device 102 in operation 420. In an embodiment of the disclosure, the touch panel 210 may detect the external device 102, and the plurality of the piezoelectric elements 230 may measure the pressure data of the external device 102, in response to a detection signal corresponding to the external device 102.

In an embodiment of the disclosure, the electronic device 100 (e.g., the processor 240 of FIG. 2) may determine the alignment of the external device 102 and the wireless charging coil 220 based on the pressure data, in operation 430. In an embodiment of the disclosure, the plurality of the piezoelectric elements 230 may measure the pressure data of the external device 102, and the processor 240 may determine the alignment of the external device 102 and the wireless charging coil 220 based on the pressure data.

In an embodiment of the disclosure, the electronic device 100 (e.g., the processor 240 of FIG. 2) may output an alignment notification based on the alignment of the external device 102 and the wireless charging coil 220, in operation 440.

In an embodiment of the disclosure, the plurality of the piezoelectric elements 230 may provide the haptic feedback according to the alignment determination result.

In an embodiment of the disclosure, if the external device 102 and the wireless charging coil 220 are aligned, the processor 240 may transmit the same control signals to the plurality of the piezoelectric elements 230. The plurality of the piezoelectric elements 230 receiving the same control signal may output the uniform haptic feedback. The control signal may be the vibration voltage, the vibration frequency, the vibration period and/or the vibration time.

In an embodiment of the disclosure, if the external device 102 and the wireless charging coil 220 are mis-aligned, the processor 240 may transmit individual control signals to the plurality of the piezoelectric elements 230. The plurality of the piezoelectric elements 230 receiving the individual control signals may output differential haptic feedbacks.

In an embodiment of the disclosure, if the external device 102 and the wireless charging coil 220 are aligned, the plurality of the piezoelectric elements 230 may output the haptic feedback having relatively low vibration voltage, low vibration frequency, short vibration period and/or short vibration time. If the external device 102 and the wireless charging coil 220 are mis-aligned, the plurality of the piezoelectric elements 230 may output the haptic feedback having relatively high vibration voltage, high vibration frequency, long vibration period and/or long vibration time.

In an embodiment of the disclosure, if the external device 102 does not correspond to the wireless charging device, a haptic feedback distinguished from the haptic feedback which is outputted according to the external device 102 corresponding to the wireless charging device and the alignment or the mis-alignment of the wireless charging coil 220 and the external device 102 may be outputted. For example, if the wireless charging coil 220 and the external device 102 are aligned and a first haptic feedback is outputted by the first control signal, or if the wireless charging coil 220 and the external device 102 are mis-aligned and a second haptic feedback is outputted by the second control signal, a third control signal different from the first control signal and the second control signal may output a third haptic feedback with respect to the external device 102 not corresponding to the wireless charging device.

In an embodiment of the disclosure, the electronic device 100 may receive the power data from the external device 102 through the wireless charging coil 220. In an embodiment of the disclosure, based on the received power data, the processor 240 may determine a device type (e.g., a smart phone, a wireless earphone, a wearable band) of the external device 102. In an embodiment of the disclosure, the processor 240 may provide a differential haptic feedback depending on the device type of the external device 102. For example, if determining that the external device 102 is the smart phone, the processor 240 may output the first haptic feedback using the plurality of the piezoelectric elements 230. If determining that the external device 102 is the wireless earphone, the processor 240 may output the second haptic feedback which is different from the first haptic feedback using the plurality of the piezoelectric elements 230.

As mentioned above, if the processor 240 transmits the control signals to the plurality of the piezoelectric elements 230, the plurality of the piezoelectric elements 230 receiving the control signals may provide the haptic feedback according to, for example, but not limited to, the received control signals. For example, if determining that the external device 102 and the wireless charging coil 220 are aligned, the processor 240 may transmit a control signal having relatively high vibration voltage, low vibration frequency, short vibration period and/or short vibration time. In another embodiment of the disclosure, if determining that the external device 102 and the wireless charging coil 220 are mis-aligned, the processor 240 may transmit a control signal having relatively low vibration voltage, high vibration frequency, long vibration period and/or long vibration time.

Figure 5:
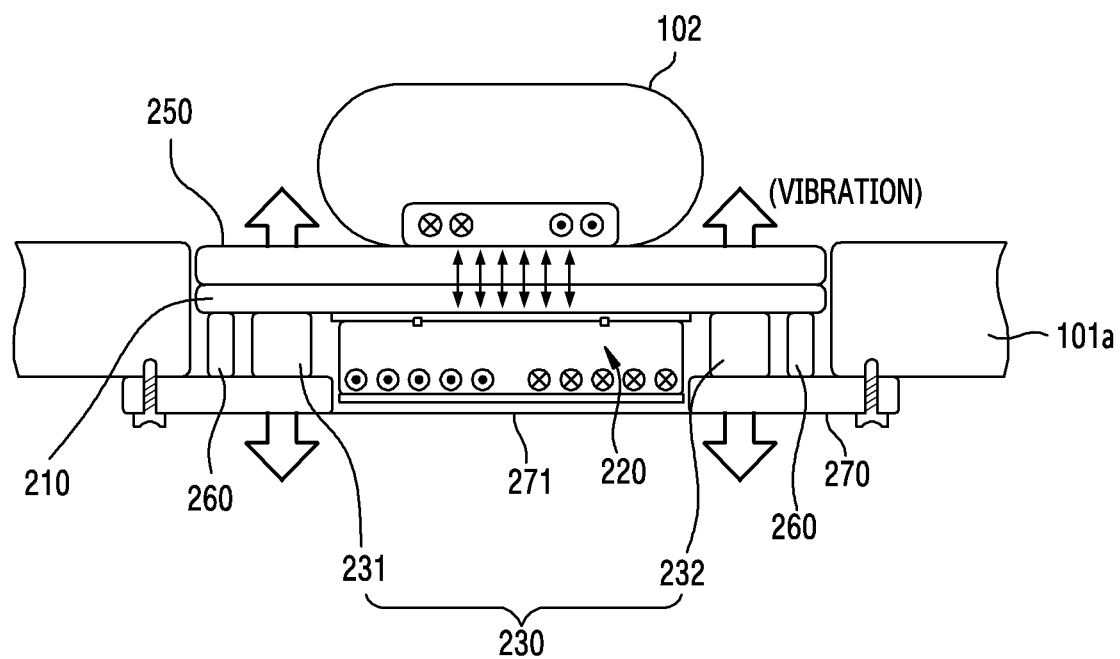
FIG. 5 is a cross-sectional view of an electronic device for a wireless charging function to provide a touch pad and a haptic feedback according to an embodiment of the disclosure.

FIG. 5 is a cross-sectional view of an electronic device 100 for a wireless charging function to provide a touch pad 120 and a haptic feedback according to an embodiment of the disclosure.

Referring to FIG. 5, in an embodiment of the disclosure, the cross-sectional view of the electronic device 100 is taken along a line A-A' of FIG. 3A.

Referring to FIG. 5, in an embodiment of the disclosure, the electronic device 100 may include the first housing 101*a* which forms at least part of the exterior of the electronic device 100, the support member 270 which forms at least part of a rear surface of the electronic device 100, and the touch pad 120 which is exposed through at least partial opening of the first housing 101*a*. The touch panel 210, the wireless charging coil 220, the plurality of the piezoelectric elements 230, the cover member 250, and/or the elastic member 260 may be disposed in a space of the first housing 101*a*.

In an embodiment of the disclosure, if the external device 102 is placed near the touch pad 120, the external device 102 may wirelessly receive the power through the wireless charging device (e.g., the wireless charging coil 220) and charge its battery therein.

In an embodiment of the disclosure, the wireless charging coil 220 may wirelessly supply the power to the external device 102 using the electromagnetic induction. Now, the wireless power transmission of the electronic device 100 using the electromagnetic induction shall be further described.

In an embodiment of the disclosure, the wireless charging device may include the wireless charging coil 220 (e.g., a TX coil) a coil FPCB, and/or a shielding material. The wireless charging coil 220 may be disposed below the touch pad 120 and/or on the FPCB. The shielding material may be disposed below the wireless charging coil 220.

In an embodiment of the disclosure, if electric current flows through the wireless charging coil 220, a magnetic field may be created around the wireless charging coil 220, and the created magnetic field may reach the external device 102 placed on the touch pad 120. In so doing, the magnetic field may generate an induced current in the external device 102 with high efficiency, only by relatively precisely placing the wireless charging coil 220 disposed below the touch pad 120 and the power receiving coil (e.g., an RX coil) of the external device 102.

In an embodiment of the disclosure, the plurality of the piezoelectric elements 230 may be disposed around the wireless charging coil 220, to measure the pressure data of the external device 102 placed on the touch pad 120. Based on the pressure data, the processor 240 may determine the alignment of the wireless charging coil 220 and the external device 102.

In an embodiment of the disclosure, the first piezoelectric element 231 disposed in the first direction (e.g., the +y direction of FIG. 3A) of the wireless charging coil 220 and the second piezoelectric element 232 disposed in the second direction (e.g., the −y direction of FIG. 3A) of the wireless charging coil 220 to face the first piezoelectric element 231 may measure the pressure of the external device 102 placed on the touch pad 120.

In an embodiment of the disclosure, if the first pressure data measured by the first piezoelectric element 231 and the second pressure data measured by the second piezoelectric element 232 are substantially the same (e.g., are the same or fall within the same range), the processor 240 may determine that the external device 102 and the wireless charging coil 220 disposed below the touch pad 120 are aligned.

In an embodiment of the disclosure, if the first pressure data and the second pressure data are not substantially the same, the processor 240 may determine the mis-alignment.

In an embodiment of the disclosure, the plurality of the piezoelectric elements 230 may output the haptic feedback, as a notification, according to the alignment determination result. For example, the processor 240 may control various vibration patterns with the control signal, and the plurality of the piezoelectric elements 230 receiving the control signal may provide the haptic feedback having various patterns. The control signal may be the vibration voltage, the vibration frequency, the vibration time and/or the vibration period.

In an embodiment of the disclosure, the elastic member 260 (e.g., a cushion) may be disposed around the plurality of the piezoelectric elements 230. By means of the elastic member 260 disposed around the plurality of the piezoelectric elements 230, the electronic device 100 may reduce the vibration generated by the plurality of the piezoelectric elements 230, which is transferred to other area than the second area a2 of the touch pad 120.

FIG. 6A is a rear view of an electronic device 100 for a wireless charging function to provide a touch pad 120 and a haptic feedback according to an embodiment of the disclosure.

Referring to FIG. 6A, the electronic device 100 may include a haptic sensor circuit 510, a wireless charging circuit 520, and/or a touch panel circuit 530.

In an embodiment of the disclosure, the haptic sensor circuit 510 and the touch panel circuit 530 may be included on the same FPCB.

In an embodiment of the disclosure, the wireless charging circuit 520 may be included on a different FPCB from the FPCB including the haptic sensor circuit 510 and the touch panel circuit 530. For example, the wireless charging circuit 520 may be included in the coil FPCB including the pattern of the wireless charging coil 220.

Figure 7:
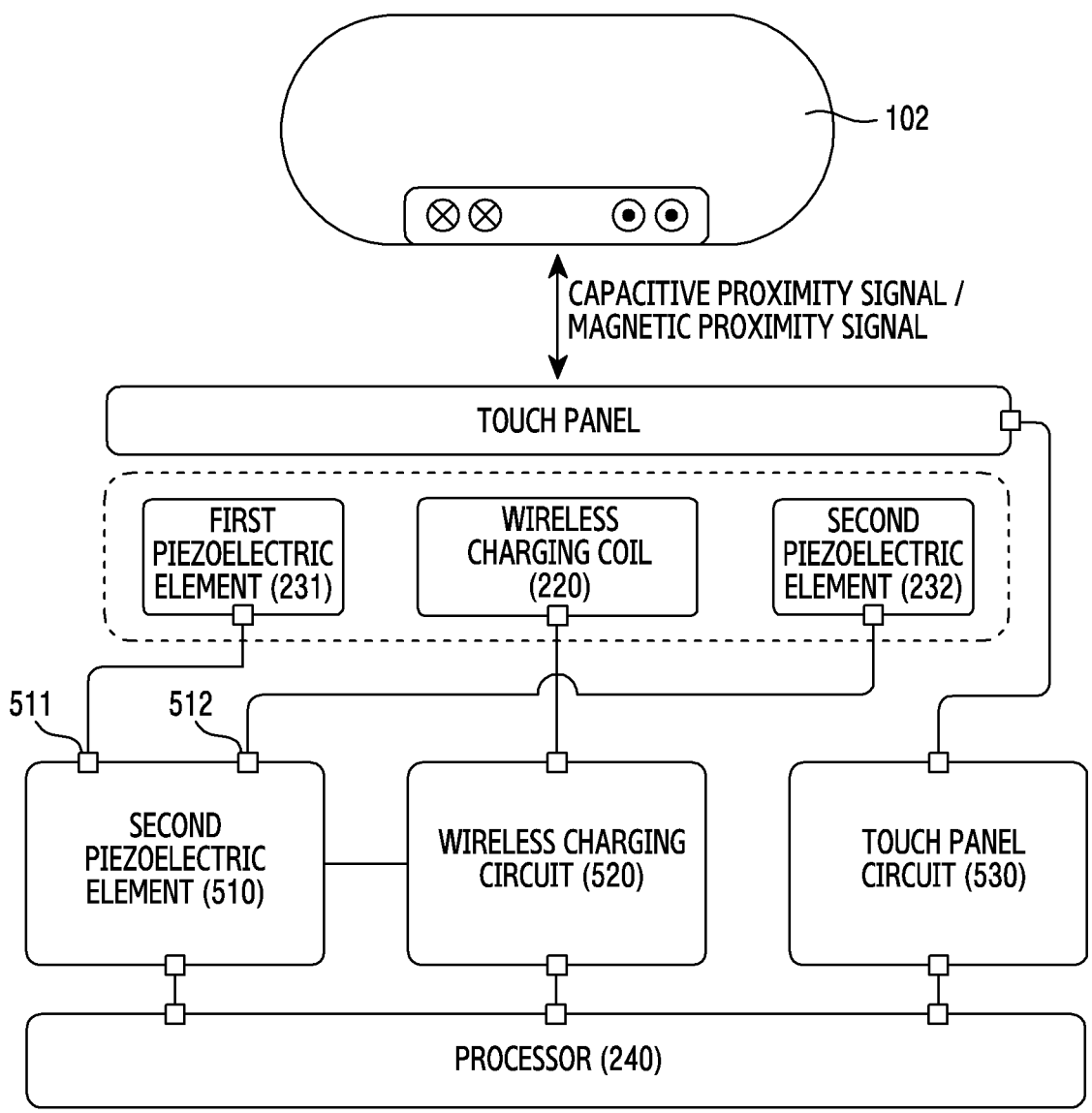
FIG. 7 is a circuit diagram of an electronic device for a wireless charging function to provide a touch pad and a haptic feedback according to an embodiment of the disclosure.

In an embodiment of the disclosure, the processor 240 may transfer the pressure data measurement signal of the external device 102 to the plurality of the piezoelectric elements 230 through the haptic sensor circuit 510 electrically connected with the plurality of the piezoelectric elements 230, to be described in FIG. 7. In an embodiment of the disclosure, the plurality of the piezoelectric elements 230 receiving the pressure data measurement signal of the external device 102 may measure the pressure data of the external device 102. The plurality of the piezoelectric elements 230 may transfer the pressure data to the processor 240 through the haptic sensor circuit 510. The processor 240 may receive the pressure data from the plurality of the piezoelectric elements 230 through the haptic sensor circuit 510.

In an embodiment of the disclosure, the processor 240 may transfer a power supply signal to the wireless charging circuit 520 electrically connected with the wireless charging coil 220. The wireless charging coil 220 receiving the power supply signal may provide the power to the external device 102.

In an embodiment of the disclosure, the processor 240 may receive a detection signal corresponding to the external device 102 inputted from the touch panel 210, through the touch panel circuit 530 electrically connected with the touch panel 210.

FIG. 6B is a rear view of an electronic device 100 for a wireless charging function to provide a touch pad 120 and the haptic feedback according to an embodiment of the disclosure.

Referring to FIG. 6B, in an embodiment of the disclosure, the electronic device 100 may include the vibrating element 280, in place of the plurality of the piezoelectric elements 230.

In an embodiment of the disclosure, the vibrating element 280 may be disposed below the touch panel 210 (e.g., in the −z direction of FIG. 3A). For example, the vibrating element 280 may be attached below the touch panel 210. For example, the vibrating element 280 may be attached onto a support member (e.g., the support member 270 of FIG. 5) (e.g., in the +z direction of FIG. 3A).

In an embodiment of the disclosure, the touch panel 210 may further include a pressure sensor, and the pressure sensor may measure the pressure of the external device 102. The processor 240 may determine the alignment of the wireless charging coil 220 and the external device 102 based on the pressure data, and the vibrating element 280 may provide the haptic feedback according to the alignment determination result.

FIG. 6C is a rear view of an electronic device 100 for a wireless charging function to provide a touch pad 120 and the haptic feedback according to an embodiment of the disclosure.

Referring to FIG. 6C, the wireless charging coil 220 may include the inner coil 220a and the outer coil 220b.

FIG. 7 is a circuit diagram of an electronic device 100 for a wireless charging function to provide a touch pad 120 and a haptic feedback according to an embodiment of the disclosure.

Referring to FIG. 7, the electronic device 100 may include the haptic sensor circuit 510, the wireless charging circuit 520, the touch panel circuit 530, and the processor 240 which controls the haptic sensor circuit 510, the wireless charging circuit 520, and the touch panel circuit 530.

In an embodiment of the disclosure, the processor 240 may transfer the pressure data measurement signal of the external device 102 to the plurality of the piezoelectric elements 230 through the haptic sensor circuit 510 electrically connected with the plurality of the piezoelectric elements 230. In an embodiment of the disclosure, the plurality of the piezoelectric elements 230 receiving the pressure data measurement signal of the external device 102 may measure the pressure data of the external device 102. The plurality of the piezoelectric elements 230 may transfer the pressure data to the processor 240 through the haptic sensor circuit 510. The processor 240 may receive the pressure data from the plurality of the piezoelectric elements 230 through the haptic sensor circuit 510.

In an embodiment of the disclosure, the processor 240 may determine the alignment of the wireless charging coil 220 and the external device 102 based on the pressure data.

In an embodiment of the disclosure, among the plurality of the piezoelectric elements 230, the first piezoelectric element 231 disposed in the first direction (e.g., the +y direction of FIG. 3A) of the wireless charging coil 220 may be electrically connected with the haptic sensor circuit 510 through a first channel 511.

In an embodiment of the disclosure, first pressure data measured by the first piezoelectric element 231 may be transferred to the processor 240 through the haptic sensor circuit 510.

In an embodiment of the disclosure, the second piezoelectric element 232 disposed in the second direction (e.g., the −y direction of FIG. 3A) of the wireless charging coil 220 may be electrically connected with the haptic sensor circuit 510 through a second channel 512.

In an embodiment of the disclosure, second pressure data measured by the second piezoelectric element 232 may be transferred to the processor 240 through the haptic sensor circuit 510.

In an embodiment of the disclosure, the processor 240 may determine the alignment of the wireless charging coil 220 and the external device 102, based on the received first pressure data and second pressure data. In an embodiment of the disclosure, the processor 240 may transmit a control signal corresponding to the alignment determination result to the plurality of the piezoelectric elements 230 through the haptic sensor circuit 510, and the plurality of the piezoelectric elements 230 receiving the control signal may output the haptic feedback as a notification.

In an embodiment of the disclosure, if the first pressure data of the external device 102 measured by the first piezoelectric element 231 and the second pressure data of the external device 102 measured by the second piezoelectric element 232 are substantially the same, the processor 240 may determine that the wireless charging coil 220 and the external device 102 are aligned. In an embodiment of the disclosure, in response to the alignment determination result, the processor 240 may transmit the same control signal having a first vibration voltage, a first vibration frequency, a first vibration time, and a first vibration period to the first piezoelectric element 231 and the second piezoelectric element 232 through the first channel 511 and the second channel 512 which are electrically connected with the haptic sensor circuit 510.

In an embodiment of the disclosure, if the first pressure data of the external device 102 measured by the first piezoelectric element 231 and the second pressure data of the external device 102 measured by the second piezoelectric element 232 are not substantially the same and the first pressure data is greater than the second pressure data, the processor 240 may determine that the wireless charging coil 220 and the external device 102 are mis-aligned.

In an embodiment of the disclosure, in response to the mis-alignment determination result, the processor 240 may transmit the same control signal having a second vibration voltage higher than the first vibration voltage, a second vibration frequency higher than the first vibration frequency, a second vibration time longer than the first vibration time, and a second vibration period longer than the first vibration period to the first piezoelectric element 231 and the second piezoelectric element 232 through the first channel 511 and the second channel 512 which are electrically connected with the haptic sensor circuit 510.

In another embodiment of the disclosure, if the first pressure data is greater than the second pressure data, in response to the mis-alignment determination result, the processor 240 may transmit a control signal having the second vibration voltage, the second vibration frequency, the second vibration period, and the second vibration time to the first piezoelectric element 231 through the first channel 511 electrically connected with the haptic sensor circuit 510. The processor 240 may transmit a control signal having the first vibration voltage, the first vibration frequency, the first vibration period, and the first vibration time to the second piezoelectric element 232 through the second channel 512 electrically connected with the haptic sensor circuit 510. The plurality of the piezoelectric elements 230 receiving the individual control signals may provide different haptic feedbacks.

The disclosure is not limited thereto. For example, the processor 240 may transmit various control signals (e.g., the vibration voltage, the vibration frequency, the vibration period and/or the vibration time) to the plurality of the piezoelectric elements 230 through the haptic sensor circuit 510, and the plurality of the piezoelectric elements 230 may output haptic feedbacks having various haptic patterns.

In an embodiment of the disclosure, the processor 240 may transfer a power supply signal to the wireless charging circuit 520 electrically connected with the wireless charging coil 220. The wireless charging coil 220 receiving the power supply signal may provide the power to the external device 102. In an embodiment of the disclosure, if the external device 102 and the wireless charging coil 220 are aligned, the processor 240 may transmit a power supply signal of a first voltage and a first current to the wireless charging coil 220 through the wireless charging circuit 520. If the external device 102 and the wireless charging coil 220 are mis-aligned, the processor 240 may transmit a power supply signal of a second voltage higher than the first voltage and a second current higher than the first current to the wireless charging coil 220 through the wireless charging circuit 520, for the sake of charging efficiency. Since the wireless charging coil 220 receives the higher voltage and current in the mis-alignment of the wireless charging coil 220 and the external device 102 than the alignment, heat may generate at the electronic device 100.

In an embodiment of the disclosure, the processor 240 may receive the detection signal corresponding to the external device 102 inputted from the touch panel 210, through the touch panel circuit 530 electrically connected with the touch panel 210.

Figure 8:
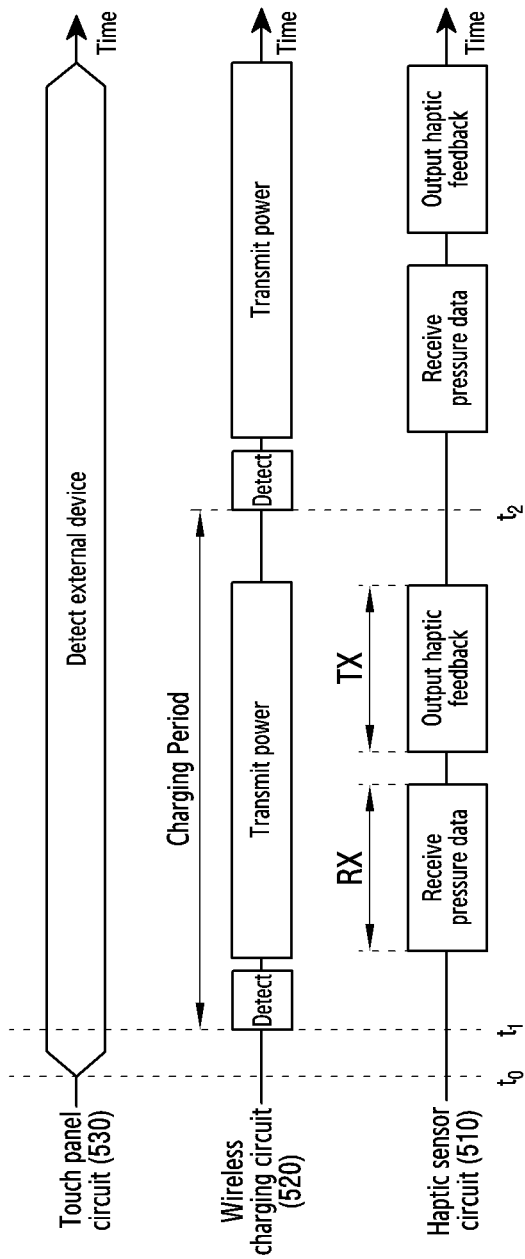
FIG. 8 is an initial timing diagram of an electronic device for a wireless charging function according to an embodiment of the disclosure.

FIG. 8 is an initial timing diagram of an electronic device 100 for a wireless charging function according to an embodiment of the disclosure.

Referring to FIG. 8, if the external device 102 approaches the touch pad 120, the touch panel 210 may detect the external device 102 at a time t0, and transfer a detection signal corresponding to the external device 102 to the processor 240 through the touch panel circuit 530.

In an embodiment of the disclosure, in response to receiving the detection signal corresponding to the external device 102, the processor 240 may transfer a power supply signal to the wireless charging circuit 520. The wireless charging coil 220 may receive the power supply signal through the wireless charging circuit 520 at a time t1, and supply the power to the external device 102. At the time t1, the wireless charging coil 220 may supply the power to the external device 102 and concurrently receive the power data from the external device 102. The power data may include device identification information including type information of the external device 102.

In an embodiment of the disclosure, if receiving the detection signal corresponding to the external device 102 through the touch panel circuit 530 and the power supply signal through the wireless charging circuit 520, the processor 240 may transfer a pressure data measurement signal to the haptic sensor circuit 510. The haptic sensor circuit 510 may acquire the pressure data of the external device 102 using the plurality of the piezoelectric elements 230.

In an embodiment of the disclosure, the haptic sensor circuit 510 may receive the pressure data (e.g., an RX signal) of the external device 102, and transmit the pressure data to the processor 240. In an embodiment of the disclosure, the processor 240 may determine the alignment of the wireless charging coil 220 and the external device 102 based on the received pressure data. The processor 240 may transmit a control signal according to the alignment determination result to the haptic sensor circuit 510. The haptic sensor circuit 510 may output the received control signal (e.g., a TX signal) as the haptic feedback through the plurality of the piezoelectric elements 230.

In an embodiment of the disclosure, if not receiving the detection signal corresponding to the external device 102 through the touch panel circuit 530 and a charging signal of the external device 102 through the wireless charging circuit 520 at the time t0, the processor 240 may transmit a first power saving mode (e.g., power saving mode) signal through the haptic sensor circuit 510, wherein the plurality of the piezoelectric elements 230 maintains standby.

In an embodiment of the disclosure, if not receiving the detection signal of the external device 102 through the touch panel circuit 530 at the time t0, the processor 240 may transmit a second power saving mode (e.g., ultra power saving mode) signal through the wireless charging circuit 520, wherein the wireless charging coil 220 maintains standby.

In an embodiment of the disclosure, if the position of the external device 102 changes on the touch pad 120 (e.g., in the +z direction of FIG. 3A) between the time t1 and a time t2, the touch panel 210 may detect the moving external device 102 at the time t2, and a detection signal corresponding to the moving external device 102 may be transferred to the processor 240 through the touch panel circuit 530. The wireless charging coil 220 may receive a power supply signal again through the wireless charging circuit 520 at the time t2, and thus supply the power to the external device 102.

In an embodiment of the disclosure, if receiving the detection signal corresponding to the external device 102 through the touch panel circuit 530 and the power supply signal through the wireless charging circuit 520, the processor 240 may transfer the pressure data measurement signal to the haptic sensor circuit 510 again. The haptic sensor circuit 510 may acquire the pressure data of the external device 102 using the plurality of the piezoelectric elements 230. If the external device 102 moves on the touch pad 120, the processor 240 may repeat the above operations.

Figure 9:
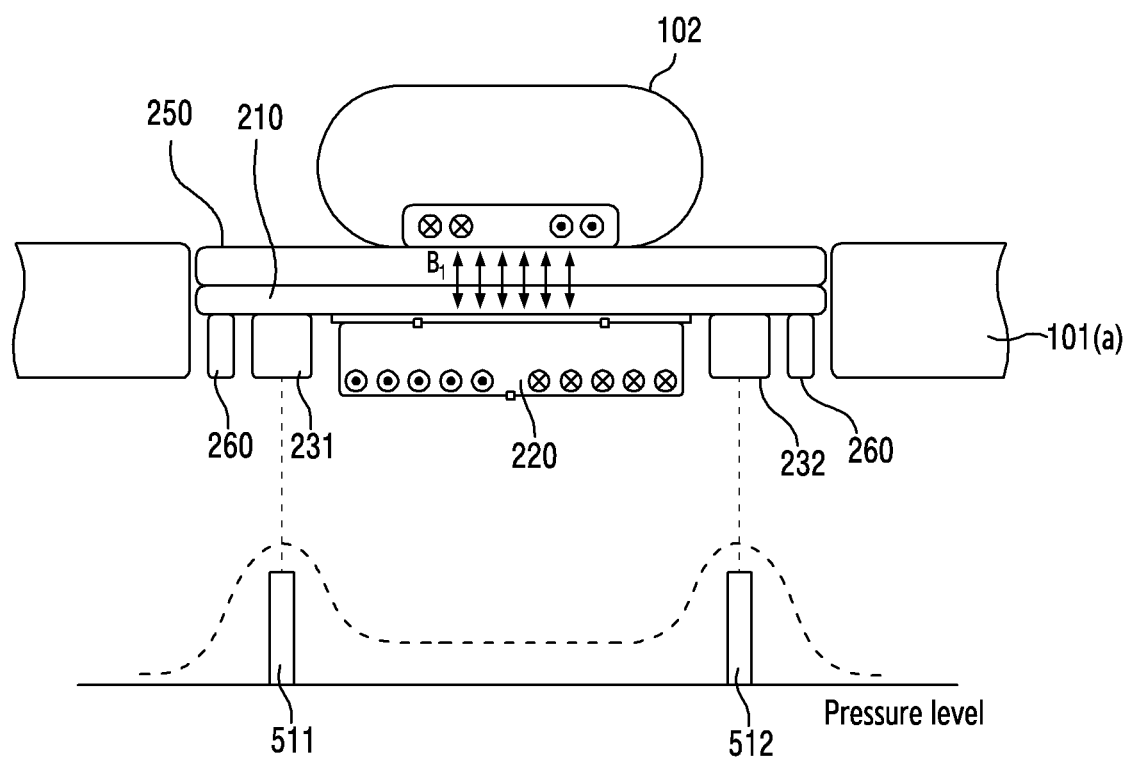
FIG. 9 is pressure distribution data and a cross-sectional view of an electronic device for a wireless charging function in alignment of an external device and a wireless charging coil according to an embodiment of the disclosure.

FIG. 9 is pressure distribution data and a cross-sectional view of an electronic device 100 for a wireless charging function in alignment of an external device 102 and a wireless charging coil 220 according to an embodiment of the disclosure.

Referring to FIG. 9, if the first pressure data of the external device 102 measured by the first piezoelectric element 231, among the plurality of the piezoelectric elements 230, disposed in the first direction (e.g., the +y direction of FIG. 3A) of the wireless charging coil 220 and the second pressure data of the external device 102 measured by the second piezoelectric element 232 disposed in the second direction (e.g., the -y direction of FIG. 3A) which faces the first direction are the same or correspond to the same range, the processor 240 may determine that the external device 102 and the wireless charging coil 220 are aligned.

In an embodiment of the disclosure, the first piezoelectric element 231 may be electrically connected with the haptic sensor circuit 510 through the first channel 511, and transmit the first pressure data to the processor 240 through the first channel 511. The second piezoelectric element 232 may be electrically connected with the haptic sensor circuit 510 through the second channel 512, and transmit the second pressure data to the processor 240 through the second channel 512.

In an embodiment of the disclosure, if the wireless charging coil 220 wirelessly supplies the power to the external device 102 and the battery in the external device 102 is charged, the electronic device 100 may receive power data from the external device 102 through the wireless charging coil 220. In an embodiment of the disclosure, the processor 240 may determine the alignment of the external device 102 and the wireless charging coil 220 based on the power data. In an embodiment of the disclosure, based on the received power data, the processor 240 may determine the device type (e.g., a smart phone, a wireless earphone, a wearable band) of the external device 102. The power data may be referred to as a charging frequency, a charging operating voltage, a charging power and/or charging efficiency. Specifically, since the charging frequency, the charging operating voltage, the charging power and the power efficiency required to transmit the power differ for each device type of the external device 102, the wireless charging coil 220 may receive the power data from the external device 102 and the processor 240 may determine the device type of the external device 102 based on the power data.

Table 1 shows power measurement data based on the type of the external device 102.

TABLE 1

| Mobile device type | Charging Frequency | Charging driving voltage | Charging electric power | Charging efficiency |
| --- | --- | --- | --- | --- |
| Smart phone (HHP) | 110~150 KHZ | 7.4 V | 5 W~10 W | 40%~70% |
| Hearables | 130~150 KHZ | 7.4 V | 1 W~3 W | 10%~35% |
| Wearable band | 125~150 KHZ | 5.2 V | 2 W~4 W | 30%~55% |

Referring to Table 1, for example, if the external device 102 and the wireless charging coil 220 are aligned, the power data received at the wireless charging coil 220 from the external device 102 is in a range 110~150 KHz, the charging operating voltage is 7.4 V, the charging power is 5~10 W, and the charging efficiency is in a range 40~70%, the processor 240 may determine the device type of the external device 102 to the smart phone.

Figure 10A:
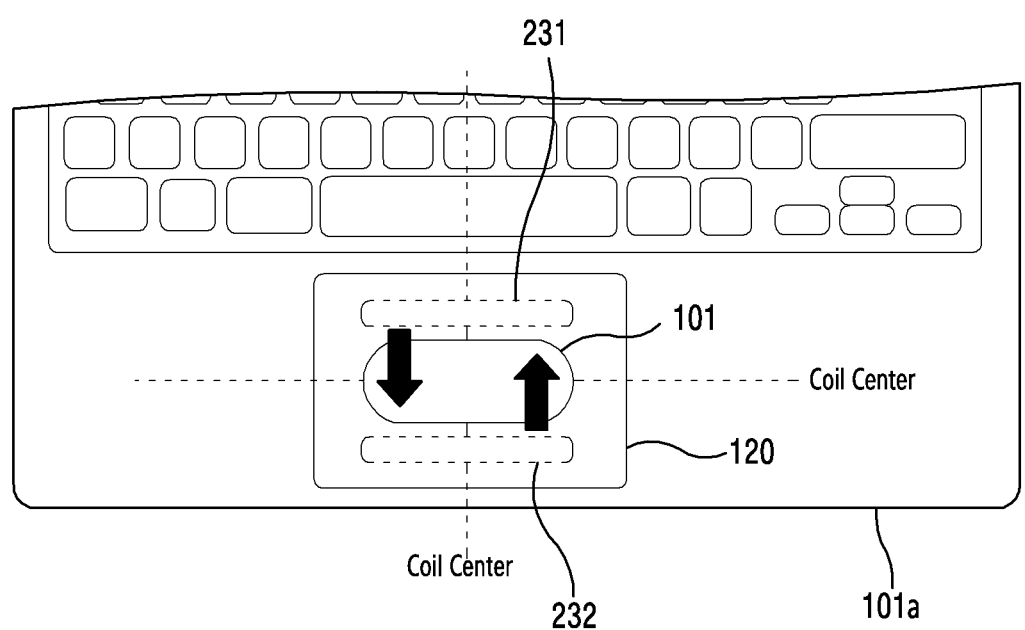
FIG. 10A is a diagram of a haptic feedback if an external device and a wireless charging coil are aligned according to an embodiment of the disclosure.

FIG. 10A illustrates haptic feedback if an external device 102 and a wireless charging coil 220 are aligned according to an embodiment of the disclosure.

Referring to FIG. 10A, if the external device 102 and the wireless charging coil 220 are aligned, the first piezoelectric element 231 and the second piezoelectric element 232 may output a notification of the alignment of the external device 102 as the haptic feedback.

In an embodiment of the disclosure, the first piezoelectric element 231 and the second piezoelectric element 232 may receive the same control signal from the processor 240 and output the uniform haptic feedbacks.

Referring to FIG. 10A, the same control signal may be represented by the same arrow size. The control signal may be understood as the vibration voltage, the vibration frequency, the vibration period, and/or the vibration time.

Figure 10B:
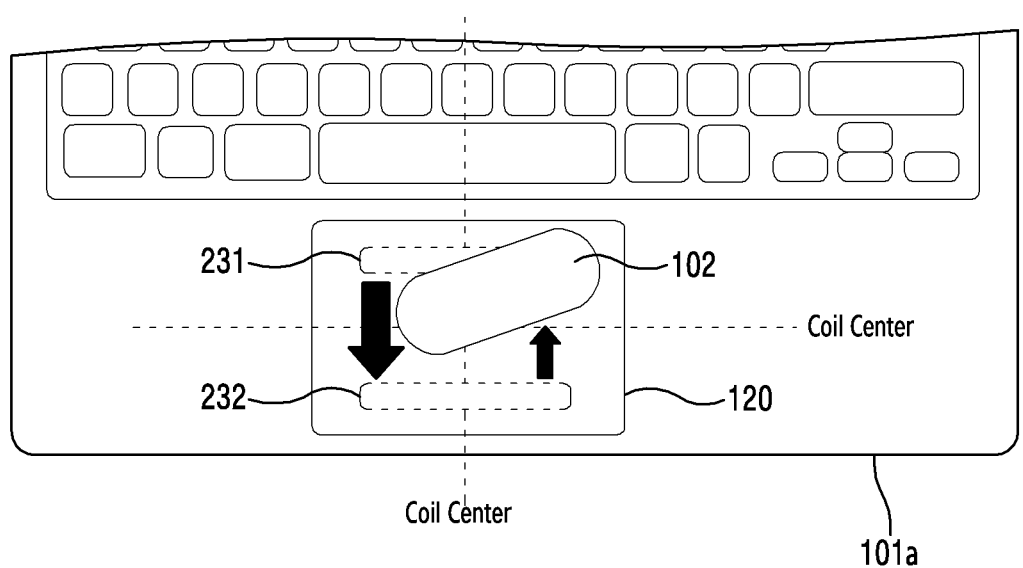
FIG. 10B is a diagram of haptic feedback if an external device and a wireless charging coil are mis-aligned according to an embodiment of the disclosure.

FIG. 10B illustrates haptic feedback if an external device 102 and a wireless charging coil 220 are mis-aligned according to an embodiment of the disclosure.

Referring to FIG. 10B, if the wireless charging coil 220 and the external device 102 are mis-aligned, the first piezoelectric element 231 and the second piezoelectric element 232 may receive individual control signals from the processor 240 and output differential haptic feedbacks.

In an embodiment of the disclosure, if the first pressure data of the external device 102 measured by the first piezoelectric element 231 and the second pressure data of the external device 102 measured by the second piezoelectric element 232 are not substantially the same and the first pressure data is greater than the second pressure data, the processor 240 may determine that the wireless charging coil 220 and the external device 102 are mis-aligned.

In an embodiment of the disclosure, the first piezoelectric element 231 may receive the control signal having the higher vibration voltage than the vibration voltage value received at the second piezoelectric element 232, and thus output a strong haptic vibration.

In an embodiment of the disclosure, the second piezoelectric element 232 may receive the control signal having the lower vibration voltage than the vibration voltage value received at the first piezoelectric element 231, and thus output a weak haptic vibration. Hence, the plurality of the piezoelectric elements 230 may provide the differential haptic feedbacks, wherein the user may recognize the misalignment degree of the wireless charging coil 220 and the external device 102.

Referring to FIG. 10B, the strong haptic vibration outputted by the first piezoelectric element 231 may be expressed by a big arrow, and the weak haptic vibration outputted by the second piezoelectric element 232 may be expressed by a small arrow.

In an embodiment of the disclosure, if the wireless charging coil 220 and the external device 102 are misaligned, the power is not normally transmitted to the external device 102 through the wireless charging coil 220 and accordingly the power data of low efficiency of the external device 102 may be received through the wireless charging coil 220.

Figure 11A:
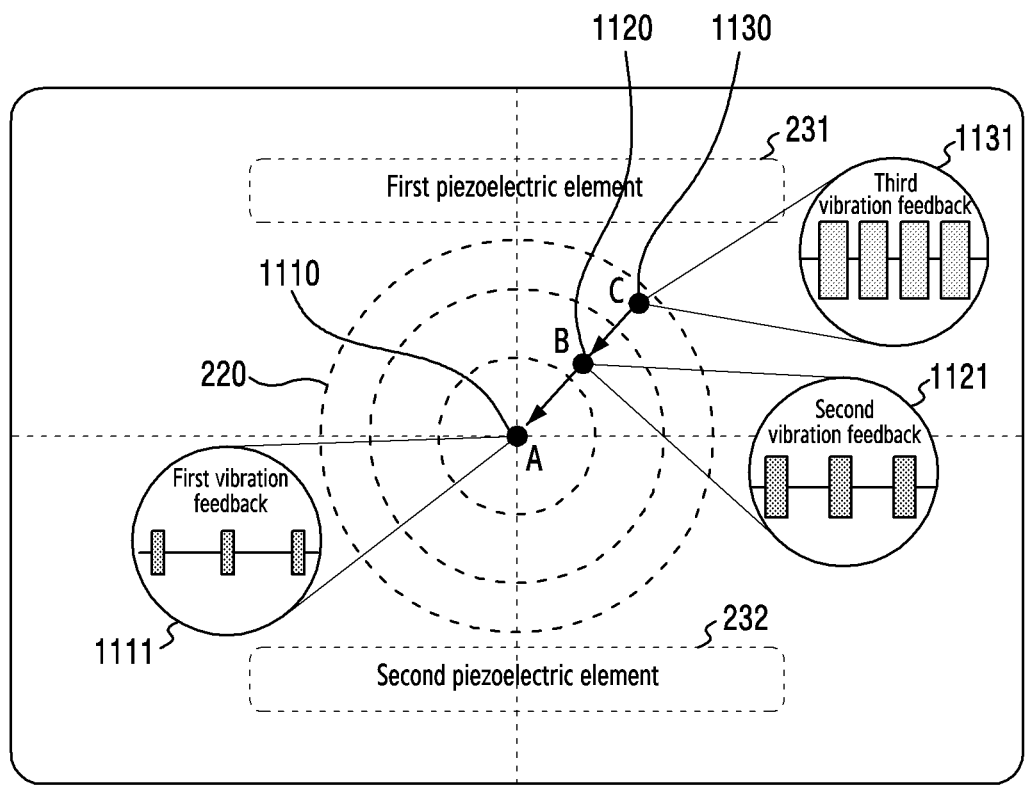
FIG. 11A is a diagram of a movement of an external device on a touch pad and its haptic feedback according to an embodiment of the disclosure.

FIG. 11A illustrates a movement of an external 102 device on a touch pad 120 and its haptic feedback according to an embodiment of the disclosure.

Table 2 shows a center position movement of a coil formed in the external device 102 and its pressure ratio according to the movement of the external device 102 on the touch pad 120, and a haptic feedback control signal value.

TABLE 2

| Charging position | Pressure ratio (the first pressure data/ the second pressure data) | Haptic voltage (V) | Vibration frequency (Hz) | Vibration time (Sec) |
|---|---|---|---|---|
| A(1110) | 1 | 40 V | 10 Hz | 100 ms |
| B(1120) | 2 | 50 V | 20 Hz | 150 ms |
| C(1130) | 2 | 60 V | 40 Hz | 200 ms |

Referring to FIG. 11A and Table 2, if the wireless charging coil 220 and the external device 102 are mis-aligned, the center position of the coil formed in the external device 102 moves from C 1130, via B 1120, to the position A 1110 at which the center of the coil formed in the external device 102 and the wireless charging coil 220 match, which is the alignment of the wireless charging coil 220 and the external device 102, according to the position adjustment of the external device 102. Hence, the first piezoelectric element 231 and the second piezoelectric element 232 may output the differential haptic feedbacks.

In an embodiment of the disclosure, if the center position of the coil formed in the external device 102 is C 1130, the first pressure data of the external device 102 measured using the first piezoelectric element 231 may be measured as a higher pressure level value than the second pressure data of the external device 102 measured using the second piezoelectric element 232. In an embodiment of the disclosure, the first piezoelectric element 231 and the second piezoelectric element 232 may receive from the processor 240 a control signal having a third vibration voltage, a third vibration frequency, a third vibration period and/or a third vibration time and output a third haptic feedback 131, to provide the user with a strong and fast haptic feedback.

In an embodiment of the disclosure, if the user detecting the third haptic feedback 1131 adjusts the position of the external device 102 and moves the center position of the coil formed in the external device 102 to B 1120, the center position of the coil formed in the external device 102 may be relatively closer to the center position of the wireless charging coil 220 than C 1130. In an embodiment of the disclosure, the first piezoelectric element 231 and the second piezoelectric element 232 may receive from the processor 240 a control signal having the second vibration voltage lower than the third vibration voltage of the third haptic feedback 1131, the second vibration frequency lower than the third vibration frequency, and the second vibration time lower than the third vibration time, and output a second haptic feedback 1121.

In an embodiment of the disclosure, in response to detecting the second haptic feedback 1121, if the user adjusts the position of the external device 102 and the center position of the coil formed in the external device 102 is A 1110, the center position of the coil formed in the external device 102 may match the center of the wireless charging coil 220. In an embodiment of the disclosure, the processor 240 may determine the alignment of the external device 102 and the wireless charging coil 220. In an embodiment of the disclosure, the first piezoelectric element 231 and the second piezoelectric element 232 may receive from the processor 240 a control signal having the first vibration voltage lower than the second vibration voltage of the second haptic feedback 1121, the first vibration frequency lower than the second vibration frequency, and the first vibration time shorter than the second vibration time, and output a first haptic feedback.

Figure 11B:
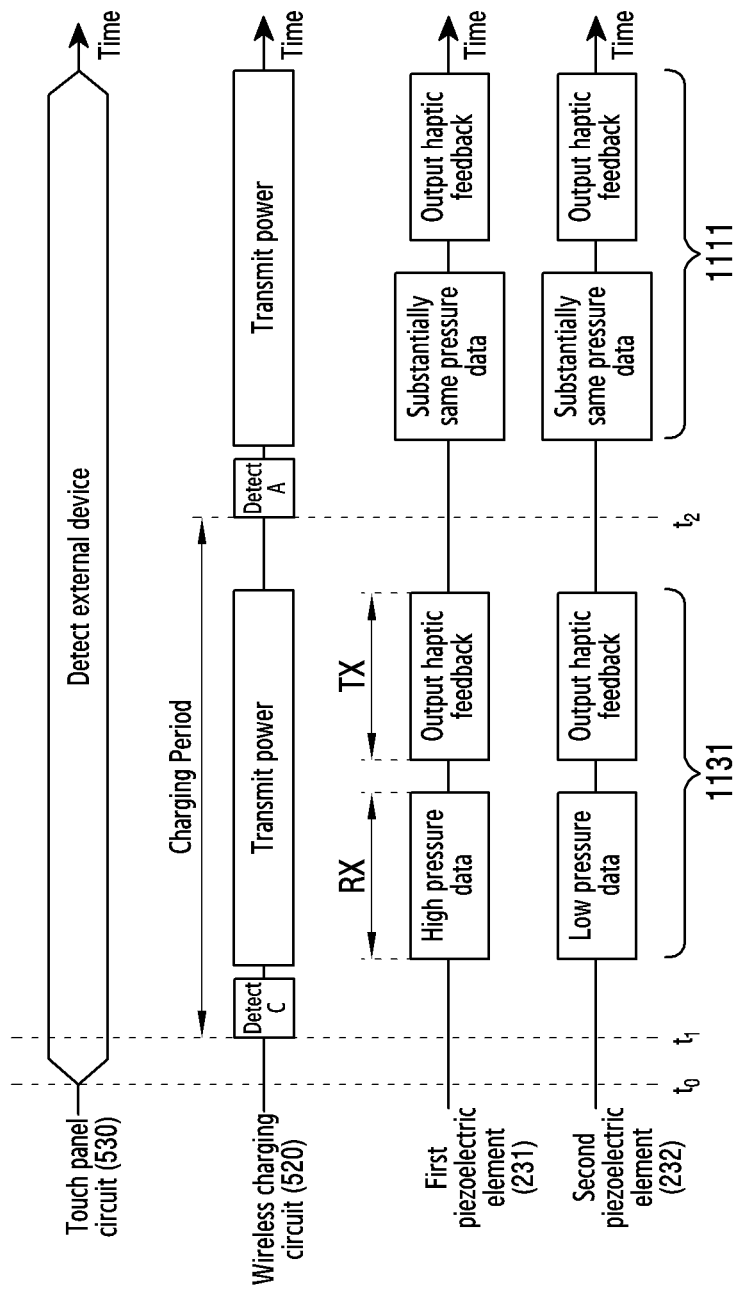
FIG. 11B is a timing diagram of a movement of an external device on a touch pad and its haptic feedback according to an embodiment of the disclosure.

FIG. 11B is a timing diagram of a position movement of an external device 102 on a touch pad 120 and its haptic feedback according to an embodiment of the disclosure.

Referring to FIG. 11B, if the external device 102 approaches the touch pad 120 and the center position of the coil in the external device 102 is C 1130, the touch panel 210 may detect the external device 102 at the time t0 and a detection signal corresponding to the external device 102 may be transferred to the processor 240 through the touch panel circuit 530.

In an embodiment of the disclosure, in response to receiving the detection signal corresponding to the external device 102, the processor 240 may transfer a power supply signal to the wireless charging circuit 520. The wireless charging coil 220 may receive the power supply signal through the wireless charging circuit 520 at the time t1 and supply the power to the external device 102. In an embodiment of the disclosure, the time t1, the wireless charging coil 220 may supply the power to the external device 102 and concurrently receive the power data from the external device 102. The power data may include the device identification information including the type information of the external device 102.

In an embodiment of the disclosure, if the center position of the coil in the external device 102 is C 1130, the first pressure data may be measured as the higher pressure data value than the second pressure data. In an embodiment of the disclosure, the first piezoelectric element 231 and the second piezoelectric element 232 may receive from the processor 240 the control signal having the third vibration voltage, the third vibration frequency, the vibration period and/or the third vibration time, and output the third haptic feedback 1131.

In an embodiment of the disclosure, if receiving the detection signal corresponding to the external device 102 through the touch panel circuit 530 and the power supply signal and/or the power data through the wireless charging circuit 520, the processor 240 may transfer a pressure data measurement signal to the haptic sensor circuit 510. The haptic sensor circuit 510 may acquire the pressure data of the external device 102 using the plurality of the piezoelectric elements 230.

In an embodiment of the disclosure, the haptic sensor circuit 510 may receive (e.g., RX) the pressure data of the external device 102, and transmit the pressure data to the processor 240. In an embodiment of the disclosure, the processor 240 may determine the alignment of the wireless charging coil 220 and the external device 102 based on the received pressure data. The processor 240 may transmit a control signal according to the alignment determination result to the haptic sensor circuit 510. The haptic sensor circuit 510 may output the received control signal (e.g., a TX signal) as the haptic feedback through the plurality of piezoelectric elements 230.

In an embodiment of the disclosure, if the plurality of the piezoelectric elements 230 outputs the third haptic feedback 1131, the user detects the vibration according to the output of the third haptic feedback 1131 and then adjusts the position of the external device 102, and the center position of the coil in the external device 102 is A 1110, the wireless charging circuit 520 may receive a power supply signal from the processor 240 at the time t2. At the time t2, the wireless charging coil 220 may supply the power to the external device 102 and concurrently receive the power data from the external device 102. The power data may include the device identification information including the type information of the external device 102.

In an embodiment of the disclosure, since the center position of the coil in the external device 102 matches the center of the wireless charging coil 220, the processor 240 may determine the alignment of the external device 102 and the wireless charging coil 220. In an embodiment of the disclosure, the first piezoelectric element 231 and the second piezoelectric element 232 may receive from the processor 240 the control signal having the first vibration voltage, the first vibration frequency, the first vibration period and/or the first vibration time, and output the first haptic feedback 1111.

Now, acquiring no pressure data of the external device 102 at the plurality of the piezoelectric elements 230 is explained by referring to the attached drawings. A power receiving unit not measuring the pressure data through the plurality of the piezoelectric elements 230 is referred to as an external device 103.

Figure 12:
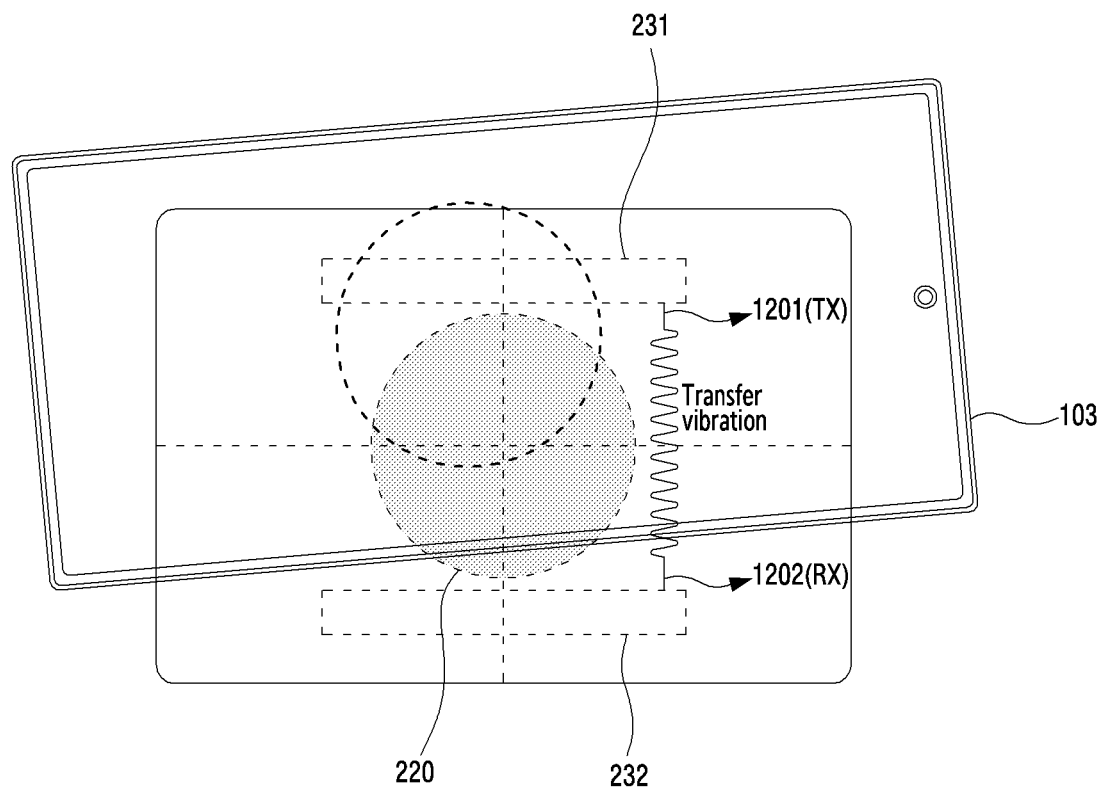
FIG. 12 is a diagram of a method for determining alignment of an external device having a relatively wide area and a wireless charging coil according to an embodiment of the disclosure.

FIG. 12 is a diagram of a method for determining alignment of an external device 130 having a relatively wide area and a wireless charging coil 220 according to an embodiment of the disclosure.

Referring to FIG. 12, in an embodiment of the disclosure, the external device 103 having the relatively wide area may include, for example, but not limited to, a tablet personal computer (PC) or a smart phone.

In an embodiment of the disclosure, if the plurality of the piezoelectric elements 230 may not acquire the pressure data of the external device 103 (e.g., if the area of the external device 103 is greater than the area of the cover member 250 exposed through the first housing 101a and it is hard for the plurality of the piezoelectric elements 230 to acquire the pressure data of the external device 103 due to the boundary difference of the cover member 250 and the palm rest), the processor 240 may not determine the alignment of the external device 103 and the wireless charging coil 220 based on the pressure data and thus may operate in a second mode which is different from the above-stated descriptions.

In an embodiment of the disclosure, in the second mode, the processor 240 may measure reflection vibration using the plurality of the piezoelectric elements 230 and thus determine the alignment of the external device 103 and the wireless charging coil 220. For example, the processor 240 may determine the alignment of the external device 103 and the wireless charging coil 220, based on a vibration output signal 1201 (e.g., TX) outputted by the first piezoelectric element 231 and a vibration receive signal 1202 (e.g., RX) received at the second piezoelectric element 232. In an embodiment of the disclosure, if the vibration output signal 1201 outputted by the first piezoelectric element 231 is greater than the vibration receive signal 1202 received at the second piezoelectric element 232 (e.g., if they are not substantially the same), the processor 240 may determine mis-alignment of the external device 103 and the wireless charging coil 220.

Figure 13:
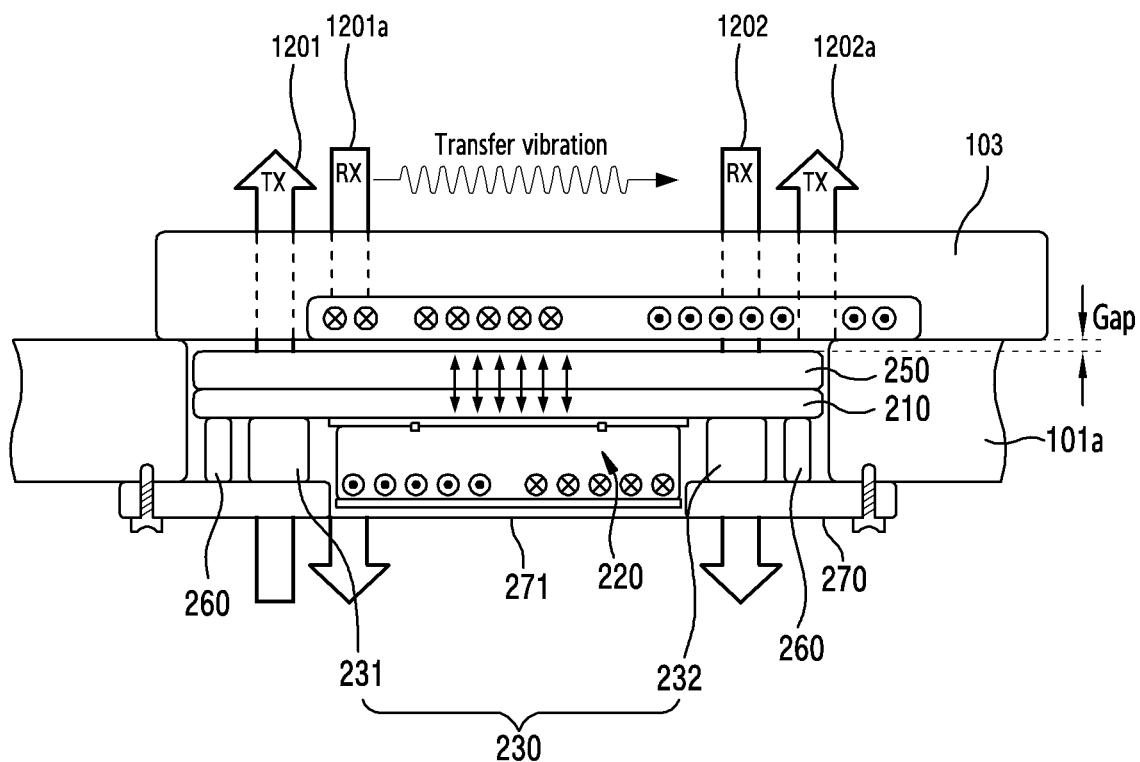
FIG. 13 is a cross-sectional view of an electronic device for a wireless charging function to provide a touch pad and a haptic feedback according to an embodiment of the disclosure.

FIG. 13 is a cross-sectional view of an electronic device 100 for a wireless charging function to provide a touch pad 120 and haptic feedback according to an embodiment of the disclosure.

Referring to FIG. 13, the first piezoelectric element 231 may output the vibration output signal 1201 (e.g., TX), the second piezoelectric element 232 may receive the vibration receive signal 1202 (e.g., RX), the second piezoelectric element 232 may output a vibration output signal 1202a (e.g., TX), and the first piezoelectric element 231 may receive a vibration receive signal 1201a (e.g., RX).

Referring to FIG. 13, since the external device 103 is placed closer to the second piezoelectric element 232 than the first piezoelectric element 231 on the touch pad 120, the vibration output signal 1201 (e.g., TX) outputted by the first piezoelectric element 231 may be smaller than the vibration receive signal 1202 (e.g., RX) received at the second piezoelectric element 232. In an embodiment of the disclosure, the processor 240 may determine the mis-alignment of the external device 103 and the wireless charging coil 220, based on the vibration output signal 1201 outputted by the first piezoelectric element 231 and the vibration receive signal 1202 received at the second piezoelectric element 232.

In an embodiment of the disclosure, the processor 240 may repeatedly execute acquiring the vibration level 1201 outputted by the first piezoelectric element 231 and the vibration level 1202 outputted through the first piezoelectric element 231 and received at the second piezoelectric element 232, and then measuring the vibration level 1202a outputted by the second piezoelectric element 232 and the vibration level 1201a outputted through the second piezoelectric element 232 and received at the first piezoelectric element 231. In an embodiment of the disclosure, the processor 240 may determine the alignment of the external device 103 and the wireless charging coil 220, based on the outputted vibration level and the received vibration level.

Referring to FIG. 13, while the first piezoelectric element 231 outputs the vibration output signal 1201 (e.g., TX) and the second piezoelectric element 232 receives the vibration output signal 1202 (e.g., RX), the second piezoelectric element 232 may output the vibration output signal 1202a (e.g., TX) and the first piezoelectric element 231 may receive the vibration output signal 1201a (e.g., RX).

Table 3 shows the vibration output signal 1202 (e.g., RX) of the second piezoelectric element 232 if first piezoelectric element 231 outputs the vibration output signal 1201 (e.g., TX) and the second piezoelectric element 232 receives the vibration output signal 1202 (e.g., RX), and the received strength and its haptic feedback control for the vibration output signal 1201a (e.g., RX) of the first piezoelectric element 231 if the second piezoelectric element 232 outputs the vibration output signal 1202a (e.g., TX) and the first piezoelectric element 231 receives the vibration output signal 1201a (e.g., RX).

TABLE 3

| Charging alignment | Receive signal strength received at the first piezoelectric element (1201a) | Receive signal strength received at the second piezoelectric element (1202) | Vibration controlling using the first piezoelectric element | Vibration controlling using the second piezoelectric element |
|---|---|---|---|---|
| Alignment | strong | strong | strong/fast | strong/fast |
| Mis-alignment | strong | weak | strong/fast | weak/slow |
| Mis-alignment | weak | strong | weak/slow | strong/fast |

In an embodiment of the disclosure, if the vibration receives signal strength 1201 received at the first piezoelectric element 231 and the vibration receive signal strength 1202 received at the second piezoelectric element 232 are strong, the processor 240 may determine the alignment of the external device 103 and the wireless charging coil 220. In an embodiment of the disclosure, the processor 240 may output the haptic feedback having relatively high vibration voltage and high vibration frequency using the first piezoelectric element 231 and the second piezoelectric element 232.

In an embodiment of the disclosure, if the vibration receives signal strength 1201 received at the first piezoelectric element 231 and the vibration receive signal strength 1202 received at the second piezoelectric element 232 are weak, the processor 240 may determine the mis-alignment of the external device 103 and the wireless charging coil 220. In an embodiment of the disclosure, the processor 240 may output the haptic feedback having relatively high vibration voltage and high vibration frequency using the first piezoelectric element 231 and the second piezoelectric element 232.

In an embodiment of the disclosure, if the vibration receives signal strength 1201 received at the first piezoelectric element 231 is stronger than the vibration receives signal strength 1202 received at the second piezoelectric element 232, the processor 240 may determine the mis-alignment of the external device 103 and the wireless charging coil 220. In an embodiment of the disclosure, the processor 240 may output the first haptic feedback having high voltage and high vibration frequency using the first piezoelectric element 231, and output the second haptic feedback having lower voltage and lower vibration frequency than the first haptic feedback using the second piezoelectric element 232.

Figure 14:
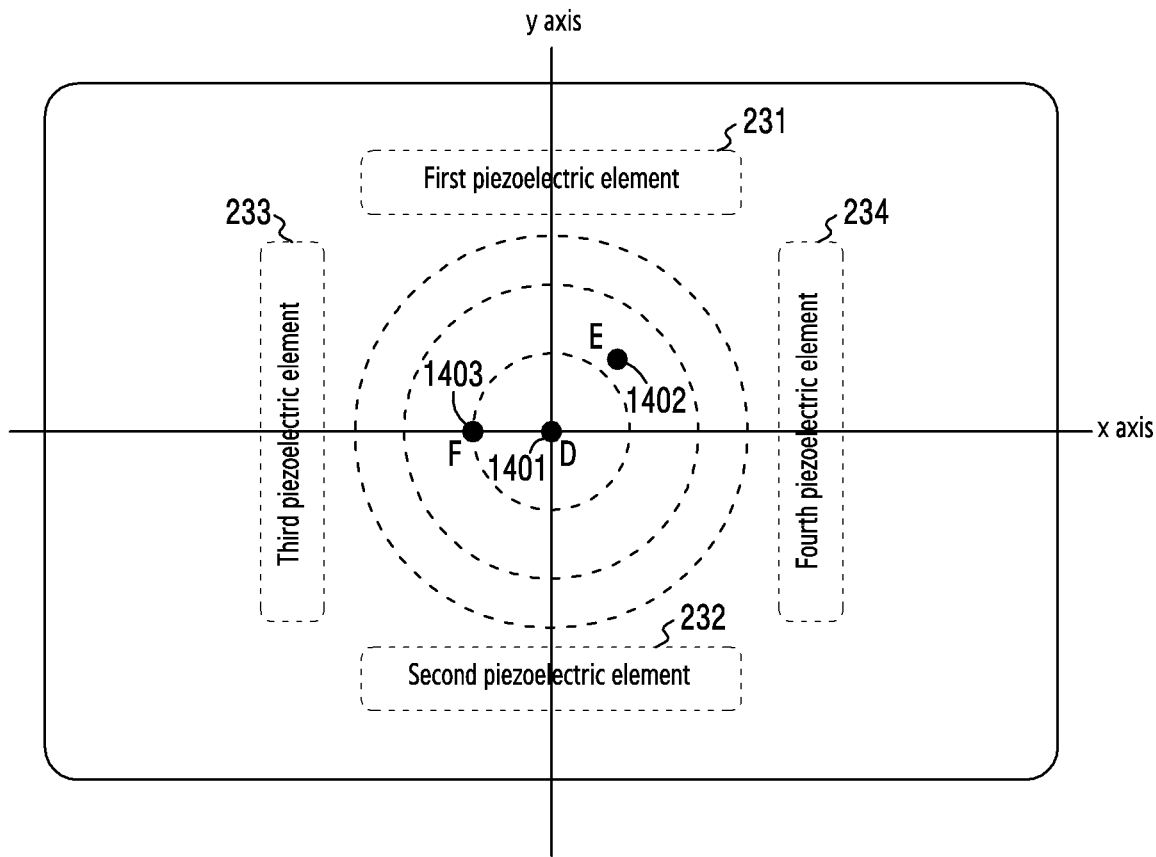
FIG. 14 is a diagram of piezoelectric elements disposed in four directions of a touch pad according to an embodiment of the disclosure.

FIG. 14 is a diagram of a plurality of piezoelectric elements 230 disposed in four directions of a touch pad 120 according to an embodiment of the disclosure.

Referring to FIG. 14, the plurality of the piezoelectric elements 230 may be disposed around the wireless charging coil 220. The plurality of the piezoelectric elements 230 may include the first piezoelectric element 231, the second piezoelectric element 232, a third piezoelectric element 233 and/or a fourth piezoelectric element 234. The first piezoelectric element 231 may be disposed in the first direction (e.g., the +y direction of FIG. 3A) of the wireless charging coil 220, in a bar shape. The second piezoelectric element 232 may be disposed in the second direction (e.g., the −y direction of FIG. 3A) of the wireless charging coil 220, in a bar shape. The third piezoelectric element 233 may be disposed in a third direction (e.g., the −x direction of FIG. 3A) of the wireless charging coil 220, in a bar shape. The fourth piezoelectric element 234 may be disposed in a fourth direction (e.g., the +x direction of FIG. 3A) of the wireless charging coil 220, in a bar shape.

In an embodiment of the disclosure, the processor 240 may acquire a first pressure ratio based on the first pressure data of the external device 102 obtained using the first piezoelectric element 231 and the second pressure data of the external device 102 obtained using the second piezoelectric element 232.

In an embodiment of the disclosure, the processor 240 may acquire a second pressure ratio based on third pressure data of the external device 102 obtained using the third piezoelectric element 233 and fourth pressure data of the external device 102 obtained using the fourth piezoelectric element 234. In an embodiment of the disclosure, the processor 240 may determine the alignment of the center position of the coil of the external device 102 on the touch pad and the wireless charging coil 220, based on the first pressure ratio and the second pressure ratio.

In an embodiment of the disclosure, virtual plane coordinates may be determined by representing the first pressure ratio on a first virtual axis (e.g., a Y axis) and the second pressure ratio on a second virtual axis (e.g., an X axis).

Table 4 shows virtual plane coordinate values of the first pressure ratio and the second pressure ratio on the touch pad 120 at a reference point D 1401, a point E 1402, and a point F 1403 based on FIG. 14.

TABLE 4

| | Reference point D 1401 | Point E 1402 | Point F 1403 |
|---|---|---|---|
| First pressure ratio (Y axis) | +1 | +2 | −2 |
| Second pressure ratio (X axis) | +1 | +2 | +1 |

In an embodiment of the disclosure, the processor 240 may obtain the first pressure ratio and the second pressure ratio based on the pressure data acquired using the plurality of the piezoelectric elements 230. In an embodiment of the disclosure, by acquiring the virtual plane coordinates on the touch pad 120 based on the first pressure ratio and the second pressure ratio, the processor 240 may determine the alignment of the center position of the coil of the external device 102 and the wireless charging coil 220.

In an embodiment of the disclosure, if both of the first pressure ratio and the second pressure ratio are 1, the wireless charging coil 220 and the center position of the coil of the external device 102 match and the processor 240 may determine the reference point for the virtual coordinate plane on the touch pad to D 1401 (e.g., (+1, +1)).

In an embodiment of the disclosure, the first pressure ratio which is the ratio (first pressure data/second pressure data) of the first pressure data of the external device 102 obtained using the first piezoelectric element 231 and the second pressure data of the external device 102 obtained using the second piezoelectric element 232 may be '+2', and the second pressure ratio which is the ratio (fourth pressure data/third pressure data) of the third pressure data of the external device 102 obtained using the third piezoelectric element 233 and the fourth pressure data of the external device 102 obtained using the fourth piezoelectric element 234 may be '+2'. In an embodiment of the disclosure, the processor 240 may determine the center position of the coil formed in the external device 102 to the virtual coordinates E (+2, +2) on the touch pad 120.

In an embodiment of the disclosure, the center position of the coil formed in the external device 102 may be outputted on the display 105.

Figure 15:
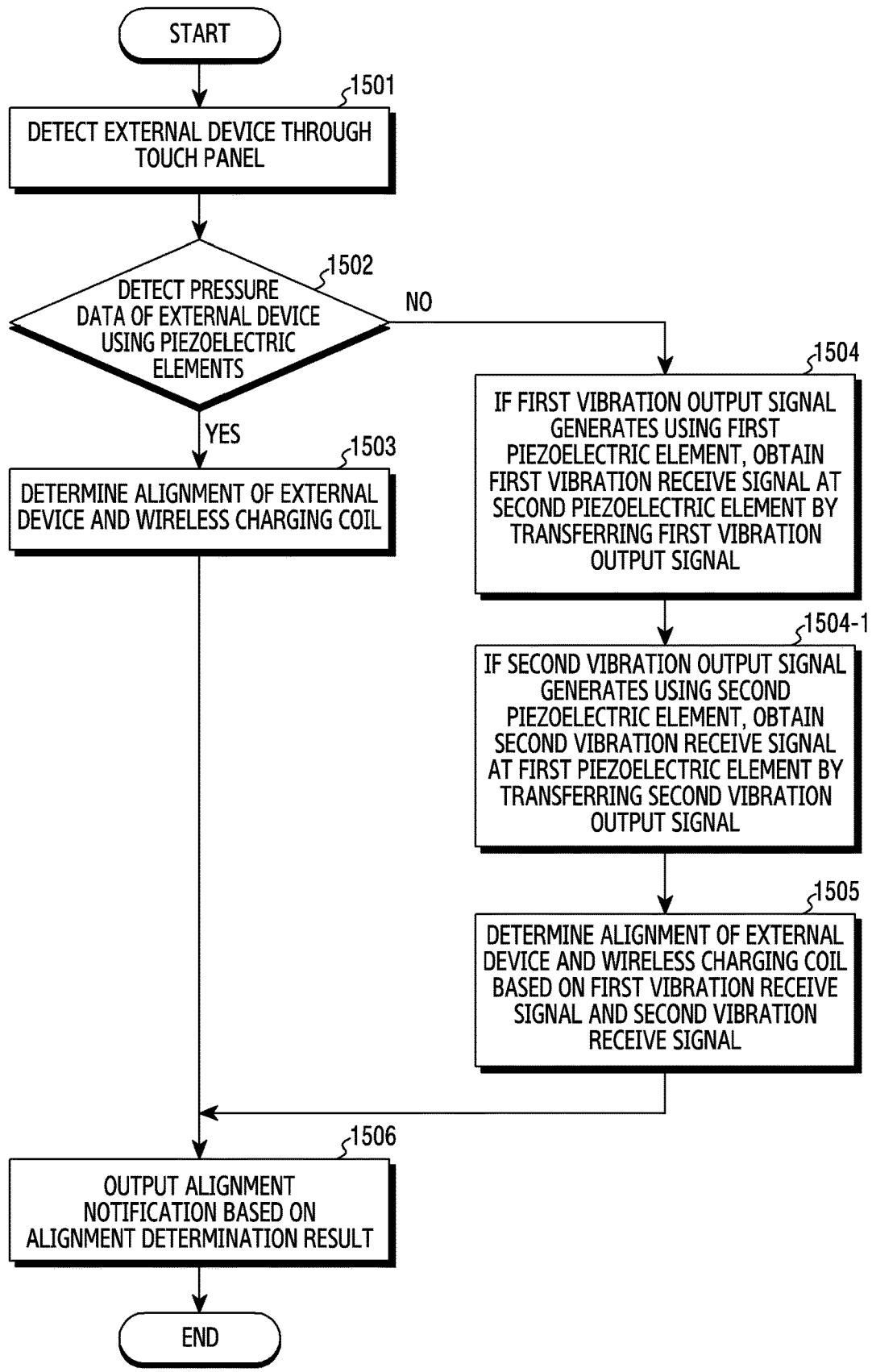
FIG. 15 is a flowchart for providing wireless charging in an electronic device according to an embodiment of the disclosure.

FIG. 15 is a flowchart for providing wireless charging in an electronic device 100 according to an embodiment of the disclosure.

Operations in the embodiment may be performed in sequence, but not necessarily. For example, the order of operations may be changed, and at least two operations may be performed in parallel.

Referring to FIG. 15, in an embodiment of the disclosure, the electronic device 100 (e.g., the processor 240 of FIG. 2) may detect the external device 102 in operation 1501. In an embodiment of the disclosure, the touch panel 210 may detect the external device 102. In another embodiment of the disclosure, operation 1501 may not correspond to the essential operation. For example, since it is meaningless to provide the haptic feedback through the plurality of the piezoelectric elements 230 to an external device which does not support the wireless charging, detecting the external device in operation 1501 may be omitted in the external device not supporting the wireless charging.

In an embodiment of the disclosure, the electronic device 100 (e.g., the processor 240 of FIG. 2) may measure the pressure data of the external device 102 in operation 1502. In an embodiment of the disclosure, the touch panel 210 may detect the external device 102, and the plurality of the piezoelectric elements 230 may measure the pressure data of the external device 102, in response to the detection signal of the external device 102.

In an embodiment of the disclosure, the electronic device 100 (e.g., the processor 240 of FIG. 2) may determine the alignment of the external device 102 and the wireless charging coil 220 based on the pressure data, in operation 1503.

In an embodiment of the disclosure, the electronic device 100 (e.g., the processor 240 of FIG. 2) may output an alignment notification according to the alignment determination result of the external device 102 and the wireless charging coil 220, in operation 1506.

In an embodiment of the disclosure, if the touch panel 210 detects the external device 103 and the plurality of the piezoelectric elements 230 may not acquire the pressure data of the external device 103 in response to the detection signal, the electronic device 100 (e.g., the processor 240 of FIG. 2) may obtain the vibration output signal 1201 outputted by the first piezoelectric element 231 and the vibration receive signal 1202 received at the second piezoelectric element 232 by transferring the vibration of the vibration output signal 1201, in operation 1504.

In an embodiment of the disclosure, the electronic device 100 (e.g., the processor 240 of FIG. 2) may obtain the vibration output signal 1202a outputted by the second piezoelectric element 232 and the vibration receive signal 1201a received at the first piezoelectric element 231 by transferring the vibration of the vibration output signal 1202a, in operation 1504-1.

In an embodiment of the disclosure, the electronic device 100 (e.g., the processor 240 of FIG. 2) may determine the alignment of the external device 103 and the wireless charging coil 220 based on the vibration receive signal 1201 outputted by the first piezoelectric element 231 and the vibration receive signal 1202 received at the second piezoelectric element 232, in operation 1505.

In an embodiment of the disclosure, the electronic device 100 (e.g., the processor 240 of FIG. 2) may output an alignment notification based on the alignment determination result of the external device 103 and the wireless charging coil 220, in operation 1506.

Table 5 shows examples of the haptic feedback controlled by the electronic device 100 according to a contact of an input target (e.g., part of a human body or a digital pen) with the touch pad 120.

TABLE 5

|  | Single/Multi touch input | Drag input |
| --- | --- | --- |
| Haptic vibration type | Impulse type | Direction type |
| Haptic e.g. | one strong vibration based on the pressure ratio | Sequential strong/weak vibration based on drag time and direction |

In an embodiment of the disclosure, if detecting a touch input signal at the touch pad 120, the plurality of the piezoelectric elements 230 may output a corresponding haptic feedback.

In an embodiment of the disclosure, if the touch input signal is the single touch or the multi touch, the plurality of the piezoelectric elements 230 may output the haptic feedback of one impulse type (e.g., one strong vibration based on the pressure ratio), based on the pressure data measured at the contact point on the touch pad 120.

In an embodiment of the disclosure, if the touch input signal is the drag, the plurality of the piezoelectric elements 230 may output a haptic feedback having a relatively high vibration voltage at the drag input start point during a drag input time from the processor 240, and may output a haptic feedback having a relatively low vibration voltage at the drag end point.

In an embodiment of the disclosure, if the input target is the digital pen, the plurality of the piezoelectric elements 230 may output no haptic feedback.

Figure 16:
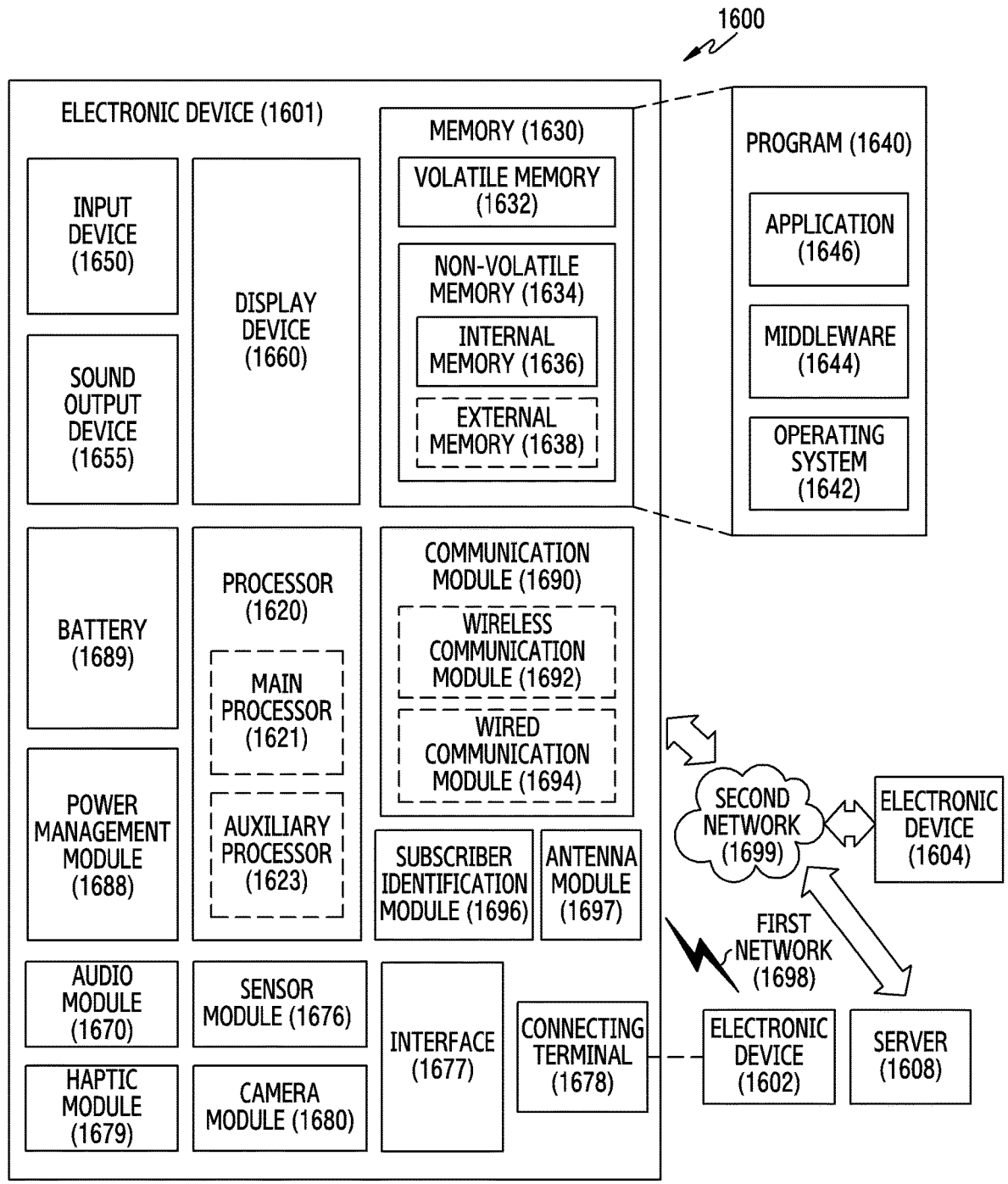
FIG. 16 is a block diagram of an electronic device in a network environment according to an embodiment of the disclosure.

FIG. 16 is a block diagram illustrating an electronic device 1601 in a network environment 1600 according to an embodiment of the disclosure.

Referring to FIG. 16, the electronic device 1601 in the network environment 1600 may communicate with an electronic device 1602 via a first network 1698 (e.g., a short-range wireless communication network), or at least one of an electronic device 1604 or a server 1608 via a second network 1699 (e.g., a long-range wireless communication network). According to an embodiment of the disclosure, the electronic device 1601 may communicate with the electronic device 1604 via the server 1608. According to an embodiment of the disclosure, the electronic device 1601 may include a processor 1620, memory 1630, an input module 1650, a sound output module 1655, a display module 1660, an audio module 1670, a sensor module 1676, an interface 1677, a connecting terminal 1678, a haptic module 1679, a camera module 1680, a power management module 1688, a battery 1689, a communication module 1690, a subscriber identification module (SIM) 1696, or an antenna module 1697. In some embodiments of the disclosure, at least one of the components (e.g., the connecting terminal 1678) may be omitted from the electronic device 1601, or one or more other components may be added in the electronic device 1601. In some embodiments of the disclosure, some of the components (e.g., the sensor module 1676, the camera module 1680, or the antenna module 1697) may be implemented as a single component (e.g., the display module 1660).

The processor 1620 may execute, for example, software (e.g., a program 1640) to control at least one other component (e.g., a hardware or software component) of the electronic device 1601 coupled with the processor 1620, and may perform various data processing or computation. According to one embodiment of the disclosure, as at least part of the data processing or computation, the processor 1620 may store a command or data received from another component (e.g., the sensor module 1676 or the communication module 1690) in volatile memory 1632, process the command or the data stored in the volatile memory 1632, and store resulting data in non-volatile memory 1634. According to an embodiment of the disclosure, the processor 1620 may include a main processor 1621 (e.g., a central processing unit (CPU) or an application processor (AP)), or an auxiliary processor 1623 (e.g., a graphics processing unit (GPU), a neural processing unit (NPU), an image signal processor (ISP), a sensor hub processor, or a communication processor (CP)) that is operable independently from, or in conjunction with, the main processor 1621. For example, when the electronic device 1601 includes the main processor 1621 and the auxiliary processor 1623, the auxiliary processor 1623 may be adapted to consume less power than the main processor 1621, or to be specific to a specified function. The auxiliary processor 1623 may be implemented as separate from, or as part of the main processor 1621.

The auxiliary processor 1623 may control at least some of functions or states related to at least one component (e.g., the display module 1660, the sensor module 1676, or the communication module 1690) among the components of the electronic device 1601, instead of the main processor 1621 while the main processor 1621 is in an inactive (e.g., sleep) state, or together with the main processor 1621 while the main processor 1621 is in an active state (e.g., executing an application). According to an embodiment of the disclosure, the auxiliary processor 1623 (e.g., an image signal processor or a communication processor) may be implemented as part of another component (e.g., the camera module 1680 or the communication module 1690) functionally related to the auxiliary processor 1623. According to an embodiment of the disclosure, the auxiliary processor 1623 (e.g., the neural processing unit) may include a hardware structure specified for artificial intelligence model processing. An artificial intelligence model may be generated by machine learning. Such learning may be performed, e.g., by the electronic device 1601 where the artificial intelligence is performed or via a separate server (e.g., the server 1608). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 1630 may store various data used by at least one component (e.g., the processor 1620 or the sensor module 1676) of the electronic device 1601. The various data may include, for example, software (e.g., the program 1640) and input data or output data for a command related thereto. The memory 1630 may include the volatile memory 1632 or the non-volatile memory 1634.

The program 1640 may be stored in the memory 1630 as software, and may include, for example, an operating system (OS) 1642, middleware 1644, or an application 1646.

The input module 1650 may receive a command or data to be used by another component (e.g., the processor 1620) of the electronic device 1601, from the outside (e.g., a user) of the electronic device 1601. The input module 1650 may include, for example, a microphone, a mouse, a keyboard, a key (e.g., a button), or a digital pen (e.g., a stylus pen).

The sound output module 1655 may output sound signals to the outside of the electronic device 1601. The sound output module 1655 may include, for example, a speaker or a receiver. The speaker may be used for general purposes, such as playing multimedia or playing record. The receiver may be used for receiving incoming calls. According to an embodiment of the disclosure, the receiver may be implemented as separate from, or as part of the speaker.

The display module 1660 may visually provide information to the outside (e.g., a user) of the electronic device 1601. The display module 1660 may include, for example, a display, a hologram device, or a projector and control circuitry to control a corresponding one of the display, hologram device, and projector. According to an embodiment of the disclosure, the display module 1660 may include a touch sensor adapted to detect a touch, or a pressure sensor adapted to measure the intensity of force incurred by the touch.

The audio module 1670 may convert a sound into an electrical signal and vice versa. According to an embodiment of the disclosure, the audio module 1670 may obtain the sound via the input module 1650, or output the sound via the sound output module 1655 or a headphone of an external electronic device (e.g., an electronic device 1602) directly (e.g., wired) or wirelessly coupled with the electronic device 1601.

The sensor module 1676 may detect an operational state (e.g., power or temperature) of the electronic device 1601 or an environmental state (e.g., a state of a user) external to the electronic device 1601, and then generate an electrical signal or data value corresponding to the detected state. According to an embodiment of the disclosure, the sensor module 1676 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1677 may support one or more specified protocols to be used for the electronic device 1601 to be coupled with the external electronic device (e.g., the electronic device 1602) directly (e.g., wired) or wirelessly. According to an embodiment of the disclosure, the interface 1677 may include, for example, a high definition multimedia interface (HDMI), a universal serial bus (USB) interface, a secure digital (SD) card interface, or an audio interface.

A connecting terminal 1678 may include a connector via which the electronic device 1601 may be physically connected with the external electronic device (e.g., the electronic device 1602). According to an embodiment of the disclosure, the connecting terminal 1678 may include, for example, a HDMI connector, a USB connector, a SD card connector, or an audio connector (e.g., a headphone connector).

The haptic module 1679 may convert an electrical signal into a mechanical stimulus (e.g., a vibration or a movement) or electrical stimulus which may be recognized by a user via his tactile sensation or kinesthetic sensation. According to an embodiment of the disclosure, the haptic module 1679 may include, for example, a motor, a piezoelectric element, or an electric stimulator.

The camera module 1680 may capture a still image or moving images. According to an embodiment of the disclosure, the camera module 1680 may include one or more lenses, image sensors, image signal processors, or flashes.

The power management module 1688 may manage power supplied to the electronic device 1601. According to one embodiment of the disclosure, the power management module 1688 may be implemented as at least part of, for example, a power management integrated circuit (PMIC).

The battery 1689 may supply power to at least one component of the electronic device 1601. According to an embodiment of the disclosure, the battery 1689 may include, for example, a primary cell which is not rechargeable, a secondary cell which is rechargeable, or a fuel cell.

The communication module 1690 may support establishing a direct (e.g., wired) communication channel or a wireless communication channel between the electronic device 1601 and the external electronic device (e.g., the electronic device 1602, the electronic device 1604, or the server 1608) and performing communication via the established communication channel. The communication module 1690 may include one or more communication processors that are operable independently from the processor 1620 (e.g., the application processor (AP)) and supports a direct (e.g., wired) communication or a wireless communication. According to an embodiment of the disclosure, the communication module 1690 may include a wireless communication module 1692 (e.g., a cellular communication module, a short-range wireless communication module, or a global navigation satellite system (GNSS) communication module) or a wired communication module 1694 (e.g., a local area network (LAN) communication module or a power line communication (PLC) module). A corresponding one of these communication modules may communicate with the external electronic device via the first network 1698 (e.g., a short-range communication network, such as Bluetooth™, wireless-fidelity (Wi-Fi) direct, or infrared data association (IrDA)) or the second network 1699 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1692 may identify and authenticate the electronic device 1601 in a communication network, such as the first network 1698 or the second network 1699, using subscriber information (e.g., international mobile subscriber identity (IMSI)) stored in the subscriber identification module 1696.

The wireless communication module 1692 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 1692 may support a high-frequency band (e.g., the mmWave band) to achieve, e.g., a high data transmission rate. The wireless communication module 1692 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 1692 may support various requirements specified in the electronic device 1601, an external electronic device (e.g., the electronic device 1604), or a network system (e.g., the second network 1699). According to an embodiment of the disclosure, the wireless communication module 1692 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 1697 may transmit or receive a signal or power to or from the outside (e.g., the external electronic device) of the electronic device 1601. According to an embodiment of the disclosure, the antenna module 1697 may include an antenna including a radiating element including a conductive material or a conductive pattern formed in or on a substrate (e.g., a printed circuit board (PCB)). According to an embodiment of the disclosure, the antenna module 1697 may include a plurality of antennas (e.g., array antennas). In such a case, at least one antenna appropriate for a communication scheme used in the communication network, such as the first network 1698 or the second network 1699, may be selected, for example, by the communication module 1690 (e.g., the wireless communication module 1692) from the plurality of antennas. The signal or the power may then be transmitted or received between the communication module 1690 and the external electronic device via the selected at least one antenna. According to an embodiment of the disclosure, another component (e.g., a radio frequency integrated circuit (RFIC)) other than the radiating element may be additionally formed as part of the antenna module 1697.

According to various embodiments of the disclosure, the antenna module 1697 may form a mmWave antenna module. According to an embodiment of the disclosure, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment of the disclosure, commands or data may be transmitted or received between the electronic device 1601 and the external electronic device 1604 via the server 1608 coupled with the second network 1699. Each of the electronic devices 1602 or 1604 may be a device of a same type as, or a different type, from the electronic device 1601. According to an embodiment of the disclosure, all or some of operations to be executed at the electronic device 1601 may be executed at one or more of the external electronic devices 1602, 1604, or 1608. For example, if the electronic device 1601 should perform a function or a service automatically, or in response to a request from a user or another device, the electronic device 1601, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1601. The electronic device 1601 may provide the outcome, with or without further processing of the outcome, as at least part of a reply to the request. To that end, a cloud computing, distributed computing, mobile edge computing (MEC), or client-server computing technology may be used, for example. The electronic device 1601 may provide ultra low-latency services using, e.g., distributed computing or mobile edge computing. In another embodiment of the disclosure, the external electronic device 1604 may include an internet-of-things (IoT) device. The server 1608 may be an intelligent server using machine learning and/or a neural network. According to an embodiment of the disclosure, the external electronic device 1604 or the server 1608 may be included in the second network 1699. The electronic device 1601 may be applied to intelligent services (e.g., smart home, smart city, smart car, or healthcare) based on 5G communication technology or IoT-related technology.

According to various embodiments of the disclosure, an electronic device supporting a wireless charging function may include a housing, a wireless charging coil disposed in the housing, a plurality of piezoelectric elements disposed around the wireless charging coil, a touch panel apart from the wireless charging coil in one direction, and at least one processor electrically connected with the wireless charging coil, the plurality of the piezoelectric elements, and the touch panel, wherein the at least one processor may be configured to obtain pressure data of an external device placed on the touch panel using the plurality of the piezoelectric elements, determine alignment of the external device and the wireless charging coil based on the pressure data, and output an alignment notification according to a result of determining the alignment.

In an embodiment of the disclosure, the at least one processor may be configured to output a haptic feedback as the notification through the plurality of the piezoelectric elements.

In an embodiment of the disclosure, the at least one processor may be configured to, if determining the alignment, output the haptic feedback according to the same control signal for the plurality of the piezoelectric elements.

In an embodiment of the disclosure, the at least one processor may be configured to, if determining mis-alignment, output the haptic feedback according to individual control signals for the plurality of the piezoelectric elements.

In an embodiment of the disclosure, the control signal may include at least one of a vibration voltage, a vibration frequency, a vibration period, or a vibration time.

In an embodiment of the disclosure, the plurality of the piezoelectric elements may include a first piezoelectric element disposed in a first direction of the wireless charging coil, and a second piezoelectric element disposed in a second direction which faces the first direction.

In an embodiment of the disclosure, the at least one processor may be configured to operate in a first mode if determining the alignment of the external device and the wireless charging coil based on the pressure data, and operate in a second mode which is different from the first mode if not obtaining the pressure data. The at least one processor in the second mode may be configured to, if a first vibration output signal generates using the first piezoelectric element, obtain a first vibration receive signal at the second piezoelectric element by transferring the first vibration output signal, if a second vibration output signal generates using the second piezoelectric element, obtain a second vibration receive signal at the first piezoelectric element by transferring the second vibration output signal, determine the alignment of the external device and the wireless charging coil based on the first vibration receive signal and the second vibration receive signal, and output an alignment notification according to a result of determining the alignment.

In an embodiment of the disclosure, the at least one processor may be configured to, in response to detecting the external device, obtain power data of the external device using the wireless charging coil, and before determining the alignment of the external device and the wireless charging coil based on the pressure data, determine the alignment of the external device and the wireless charging coil based on the power data.

In an embodiment of the disclosure, the power data may be at least one of a charging frequency, a charging operating voltage, a charging power, or charging efficiency.

In an embodiment of the disclosure, the at least one processor may be configured to obtain a type of the external device based on the power data.

According to various embodiments of the disclosure, a method of an electronic device may include obtaining pressure data of an external device using a plurality of piezoelectric elements, determining alignment of the external device and a wireless charging coil based on the pressure data, and outputting an alignment notification according to a result of determining the alignment.

In an embodiment of the disclosure, the method may include outputting a haptic feedback as the notification through the plurality of the piezoelectric elements.

In an embodiment of the disclosure, the method may include, if determining the alignment, outputting the haptic feedback according to the same control signal for the plurality of the piezoelectric elements.

In an embodiment of the disclosure, the method may include, if determining mis-alignment, outputting the haptic feedback according to individual control signals using the plurality of the piezoelectric elements.

In an embodiment of the disclosure, the control signal may include at least one of a vibration voltage, a vibration frequency, a vibration period, or a vibration time.

In an embodiment of the disclosure, the plurality of the piezoelectric elements may include a first piezoelectric element disposed in a first direction of the wireless charging coil, and a second piezoelectric element disposed in a second direction which faces the first direction.

In an embodiment of the disclosure, the method may further include operating in a first mode if determining the alignment of the external device and the wireless charging coil based on the pressure data, and operating in a second mode which is different from the first mode if not obtaining the pressure data. In the second mode, the method may further include, if a first vibration output signal generates using the first piezoelectric element, obtaining a first vibration receive signal at the second piezoelectric element by transferring the first vibration output signal, if a second vibration output signal generates using the second piezoelectric element, obtaining a second vibration receive signal at the first piezoelectric element by transferring the second vibration output signal, determining the alignment of the external device and the wireless charging coil based on the first vibration receive signal and the second vibration receive signal, and outputting an alignment notification according to a result of determining the alignment.

In an embodiment of the disclosure, the method may further include, in response to detecting the external device, obtaining power data of the external device using the wireless charging coil, and before determining the alignment of the external device and the wireless charging coil based on the pressure data, determining the alignment of the external device and the wireless charging coil based on the power data.

In an embodiment of the disclosure, the power data may be at least one of a charging frequency, a charging operating voltage, a charging power, or charging efficiency.

In an embodiment of the disclosure, the method may further include obtaining a type of the external device based on the power data.

In various embodiments of the disclosure, the normal wireless charging may be recognized by immediately recognizing the alignment of the power transmitting unit and the power receiving unit through the haptic feedback.

In various embodiments of the disclosure, various haptic feedbacks may be provided depending on the alignment of the power receiving unit and the power transmitting unit. Thus, the user may be provided with not only the alignment of the power transmitting unit and the power receiving unit but also a direction guide for the alignment in the misalignment, through the haptic feedback.

Besides, various effects directly or indirectly identified in the disclosure may be provided.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wired), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment of the disclosure, the module may be implemented in a form of an application-specific integrated circuit (ASIC).

Various embodiments as set forth herein may be implemented as software (e.g., the program 1640) including one or more instructions that are stored in a storage medium (e.g., internal memory 1636 or external memory 1638) that is readable by a machine (e.g., the electronic device 1601). For example, a processor (e.g., the processor 1620) of the machine (e.g., the electronic device 1601) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment of the disclosure, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments of the disclosure, each component (e.g., a module or a program) of the above-described components may include a single entity or multiple entities, and some of the multiple entities may be separately disposed in different components. According to various embodiments of the disclosure, one or more of the above-described components may be omitted, or one or more other components may be added. Alternatively or additionally, a plurality of components (e.g., modules or programs) may be integrated into a single component. In such a case, according to various embodiments of the disclosure, the integrated component may still perform one or more functions of each of the plurality of components in the same or similar manner as they are performed by a corresponding one of the plurality of components before the integration. According to various embodiments of the disclosure, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device supporting a wireless charging function, the electronic device comprising:
   a housing;
   a wireless charging coil disposed in the housing;
   a plurality of piezoelectric elements disposed around the wireless charging coil;
   a touch panel spaced apart from the wireless charging coil in one direction; and
   at least one processor electrically connected with the wireless charging coil, the plurality of the piezoelectric elements, and the touch panel, wherein the at least one processor is configured to:
obtain, from each of the plurality of the piezoelectric elements, pressure data of an external device placed on the touch panel,
determine alignment of the external device and the wireless charging coil based on the pressure data obtained from each of the plurality of the piezoelectric elements, and
output an alignment notification according to a result of determining the alignment.

2. The electronic device of claim 1, wherein the at least one processor is further configured to output a haptic feedback as the alignment notification through the plurality of the piezoelectric elements.

3. The electronic device of claim 2, wherein the at least one processor is further configured to, if determining the alignment, output the haptic feedback according to an identical control signal for the plurality of the piezoelectric elements.

4. The electronic device of claim 2, wherein the at least one processor is further configured to, if determining mis-alignment, output the haptic feedback according to individual control signals for the plurality of the piezoelectric elements.

5. The electronic device of claim 3, wherein the control signal comprises at least one of a vibration voltage, a vibration frequency, a vibration period, or a vibration time.

6. The electronic device of claim 1, wherein the plurality of the piezoelectric elements comprises a first piezoelectric element disposed in a first direction of the wireless charging coil, and a second piezoelectric element disposed in a second direction which faces the first direction.

7. The electronic device of claim 6,
wherein the at least one processor is further configured to:
operate in a first mode if determining the alignment of the external device and the wireless charging coil based on the pressure data, and
operate in a second mode which is different from the first mode if not obtaining the pressure data, and
wherein the at least one processor, in the second mode, is further configured to:
if a first vibration output signal generates using the first piezoelectric element, obtain a first vibration receive signal at the second piezoelectric element by transferring the first vibration output signal,
if a second vibration output signal generates using the second piezoelectric element, obtain a second vibration receive signal at the first piezoelectric element by transferring the second vibration output signal,
determine the alignment of the external device and the wireless charging coil based on the first vibration receive signal and the second vibration receive signal, and
output an alignment notification according to a result of determining the alignment.

8. The electronic device of claim 1, wherein the at least one processor is further configured to:
in response to detecting the external device, obtain power data of the external device using the wireless charging coil; and
before determining the alignment of the external device and the wireless charging coil based on the pressure data, determine the alignment of the external device and the wireless charging coil based on the power data.

9. The electronic device of claim 8, wherein the power data is at least one of a charging frequency, a charging operating voltage, a charging power, or charging efficiency.

10. The electronic device of claim 8, wherein the at least one processor is further configured to obtain a type of the external device based on the power data.

11. A method of an electronic device, the method comprising:
obtaining, from each of a plurality of piezoelectric elements included in the electronic device, pressure data of an external device;
determining alignment of the external device and a wireless charging coil based on the pressure data obtained from the each of the plurality of the piezoelectric elements; and
outputting an alignment notification according to a result of determining the alignment.

12. The method of claim 11, further comprising:
outputting a haptic feedback as the alignment notification through the plurality of the piezoelectric elements.

13. The method of claim 12, further comprising:
if determining the alignment, outputting the haptic feedback according to an identical control signal for the plurality of the piezoelectric elements.

14. The method of claim 12, further comprising:
if determining mis-alignment, outputting the haptic feedback according to individual control signals using the plurality of the piezoelectric elements.

15. The method of claim 13, wherein the control signal comprises at least one of a vibration voltage, a vibration frequency, a vibration period, or a vibration time.

16. The method of claim 11, wherein the plurality of the piezoelectric elements comprises a first piezoelectric element disposed in a first direction of the wireless charging coil, and a second piezoelectric element disposed in a second direction which faces the first direction.

17. The method of claim 16, further comprising:
operating in a first mode if determining the alignment of the external device and the wireless charging coil based on the pressure data; and
operating in a second mode which is different from the first mode if not obtaining the pressure data, and
in the second mode, further comprising:
if a first vibration output signal generates using the first piezoelectric element, obtaining a first vibration receive signal at the second piezoelectric element by transferring the first vibration output signal,
if a second vibration output signal generates using the second piezoelectric element, obtaining a second vibration receive signal at the first piezoelectric element by transferring the second vibration output signal,
determining the alignment of the external device and the wireless charging coil based on the first vibration receive signal and the second vibration receive signal, and
outputting an alignment notification according to a result of determining the alignment.

18. The method of claim 11, further comprising:
in response to detecting the external device, obtaining power data of the external device using the wireless charging coil; and
before determining the alignment of the external device and the wireless charging coil based on the pressure data, determining the alignment of the external device and the wireless charging coil based on the power data.

19. The method of claim 18, wherein the power data is at least one of a charging frequency, a charging operating voltage, a charging power, or charging efficiency.

20. The method of claim 18, further comprising:
obtaining a type of the external device based on the power data.

\* \* \* \* \*